US009472064B2

(12) United States Patent
Acres

(10) Patent No.: US 9,472,064 B2
(45) Date of Patent: Oct. 18, 2016

(54) GAMING DEVICE HAVING VARIABLE SPEED OF PLAY

(71) Applicant: Patent Investment & Licensing Company, Las Vegas, NV (US)

(72) Inventor: John F. Acres, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 0 days.

(21) Appl. No.: 14/159,320

(22) Filed: Jan. 20, 2014

(65) Prior Publication Data

US 2014/0135093 A1 May 15, 2014

Related U.S. Application Data

(62) Division of application No. 12/204,633, filed on Sep. 4, 2008, now Pat. No. 8,657,662.

(51) Int. Cl.
*A63F 13/00* (2014.01)
*G07F 17/32* (2006.01)

(52) U.S. Cl.
CPC ........... *G07F 17/3293* (2013.01); *G07F 17/32* (2013.01); *G07F 17/3262* (2013.01)

(58) Field of Classification Search
CPC ........... G07F 17/3239; G07F 17/3293; G07F 17/3262
USPC ........................................................... 463/20
See application file for complete search history.

(56) References Cited

U.S. PATENT DOCUMENTS

| | | | |
|---|---|---|---|
| 2,669,389 | A | 2/1954 | Mesi et al. |
| 3,124,355 | A | 3/1964 | Mentzer |
| 3,124,674 | A | 3/1964 | Edwards |
| 3,684,290 | A | 8/1972 | Wayne |
| 3,727,213 | A | 4/1973 | Kurtenbach |

(Continued)

FOREIGN PATENT DOCUMENTS

| | | | |
|---|---|---|---|
| CA | 2 442 442 | C | 10/1998 |
| EP | 0141264 | A2 | 5/1985 |

(Continued)

OTHER PUBLICATIONS

Awesome Poker, Video Poker Strategy, Wayback Machine date of Jul. 12, 2007; retrieved from URL https://web.archive.org/web/20070712093728/http://www.awesomecasino.com/video-poker-strategy.php on May 30, 2014.*

(Continued)

*Primary Examiner* — Michael Grant
(74) *Attorney, Agent, or Firm* — Marger Johnson

(57) ABSTRACT

This concept is directed to gaming devices configured to vary the speed of game play, as well as method of operating gaming devices to vary the speed of play. In some examples of the this concept, a gaming device may be configured to include a game initiating button that when pressed by a player triggers a game processor to ascertain and display a first game outcome, determine if the first game outcome is a winning outcome, and automatically ascertain and display a second game outcome if the first game outcome is not a winning outcome. If the first game outcome is a winning outcome the gaming device may pause to allow the player to appreciate the win before retriggering the processor to ascertain and display subsequent gaming event outcomes, or the gaming device may wait to receive further player input.

6 Claims, 21 Drawing Sheets

(56) References Cited

U.S. PATENT DOCUMENTS

| | | | |
|---|---|---|---|
| 3,751,040 | A | 8/1973 | Carey |
| 4,240,635 | A | 12/1980 | Brown |
| 4,254,404 | A | 3/1981 | White |
| 4,283,709 | A | 8/1981 | Lucero et al. |
| 4,433,844 | A | 2/1984 | Hooker et al. |
| 4,620,707 | A | 11/1986 | Lippincott |
| 4,624,459 | A | 11/1986 | Kaufman |
| 4,652,998 | A | 3/1987 | Koza et al. |
| 4,657,256 | A | 4/1987 | Okada |
| 4,712,799 | A | 12/1987 | Fraley |
| 4,836,546 | A | 6/1989 | DiRe et al. |
| 4,837,728 | A | 6/1989 | Barrie et al. |
| 4,887,813 | A | 12/1989 | Chiles, III et al. |
| 4,911,449 | A | 3/1990 | Dickinson et al. |
| 5,022,653 | A | 6/1991 | Suttle et al. |
| 5,024,439 | A | 6/1991 | Okada |
| 5,026,058 | A | 6/1991 | Bromley |
| 5,027,102 | A | 6/1991 | Sweeny |
| 5,031,914 | A | 7/1991 | Rosenthal |
| 5,033,744 | A | 7/1991 | Bridgeman et al. |
| 5,046,736 | A | 9/1991 | Bridgeman et al. |
| 5,078,405 | A | 1/1992 | Jones et al. |
| 5,123,649 | A | 6/1992 | Tiberio |
| 5,152,529 | A | 10/1992 | Okada |
| 5,178,395 | A | 1/1993 | Lovell |
| 5,221,083 | A | 6/1993 | Dote |
| 5,265,880 | A | 11/1993 | Maksymec |
| 5,342,049 | A | 8/1994 | Wichinsky et al. |
| 5,364,104 | A | 11/1994 | Jones et al. |
| 5,377,973 | A | 1/1995 | Jones et al. |
| 5,380,008 | A | 1/1995 | Mathis et al. |
| 5,490,670 | A | 2/1996 | Hobert |
| 5,536,016 | A | 7/1996 | Thompson |
| 5,564,700 | A | 10/1996 | Celona |
| 5,584,485 | A | 12/1996 | Jones et al. |
| 5,586,766 | A | 12/1996 | Forte et al. |
| 5,655,961 | A | 8/1997 | Acres et al. |
| 5,655,965 | A | 8/1997 | Takemoto et al. |
| 5,674,128 | A | 10/1997 | Holch et al. |
| 5,695,402 | A | 12/1997 | Stupak |
| 5,697,844 | A | 12/1997 | Kohorn |
| 5,704,835 | A | 1/1998 | Dietz |
| 5,720,662 | A | 2/1998 | Holmes et al. |
| 5,743,798 | A | 4/1998 | Adams et al. |
| 5,758,875 | A | 6/1998 | Giacalone, Jr. |
| 5,766,076 | A | 6/1998 | Pease et al. |
| 5,816,918 | A | 10/1998 | Kelly et al. |
| 5,828,862 | A | 10/1998 | Singkomrat et al. |
| 5,830,064 | A | 11/1998 | Bradish et al. |
| 5,836,816 | A | 11/1998 | Bruin et al. |
| 5,836,817 | A | 11/1998 | Acres et al. |
| 5,851,147 | A | 12/1998 | Stupak et al. |
| 5,910,048 | A | 6/1999 | Feinberg |
| 5,913,726 | A | 6/1999 | Jones et al. |
| 5,934,998 | A | 8/1999 | Forte et al. |
| 5,941,770 | A | 8/1999 | Miers et al. |
| 5,960,406 | A | 9/1999 | Rasansky et al. |
| 5,984,779 | A | 11/1999 | Bridgeman et al. |
| 6,003,013 | A | 12/1999 | Boushy et al. |
| 6,012,983 | A | 1/2000 | Walker et al. |
| 6,024,642 | A | 2/2000 | Stupak |
| 6,030,109 | A | 2/2000 | Lobsenz |
| 6,032,955 | A | 3/2000 | Luciano et al. |
| 6,045,129 | A | 4/2000 | Cooper et al. |
| 6,045,130 | A | 4/2000 | Jones et al. |
| 6,048,272 | A | 4/2000 | Tsujita |
| 6,059,659 | A | 5/2000 | Busch et al. |
| 6,077,163 | A | 6/2000 | Walker et al. |
| 6,086,477 | A | 7/2000 | Walker et al. |
| 6,106,395 | A | 8/2000 | Begis |
| 6,110,041 | A | 8/2000 | Walker et al. |
| 6,110,043 | A | 8/2000 | Olsen |
| 6,135,884 | A | 10/2000 | Hedrick et al. |
| 6,146,273 | A | 11/2000 | Olsen |
| 6,165,071 | A | 12/2000 | Weiss |
| 6,168,521 | B1 | 1/2001 | Luciano et al. |
| 6,183,362 | B1 | 2/2001 | Boushy |
| 6,186,892 | B1 | 2/2001 | Frank et al. |
| 6,186,893 | B1 | 2/2001 | Walker et al. |
| 6,196,918 | B1 | 3/2001 | Miers et al. |
| 6,210,276 | B1 | 4/2001 | Mullins |
| 6,217,448 | B1 | 4/2001 | Olsen |
| 6,224,482 | B1 | 5/2001 | Bennett |
| 6,234,900 | B1 | 5/2001 | Cumbers |
| 6,254,483 | B1 | 7/2001 | Acres |
| 6,264,560 | B1 | 7/2001 | Goldberg et al. |
| 6,270,409 | B1 | 8/2001 | Shuster |
| 6,289,382 | B1 | 9/2001 | Bowman-Amuah |
| 6,293,866 | B1 | 9/2001 | Walker et al. |
| 6,293,868 | B1 | 9/2001 | Bernard |
| 6,302,793 | B1 | 10/2001 | Fertitta, III et al. |
| 6,315,662 | B1 | 11/2001 | Jorasch et al. |
| 6,319,122 | B1 | 11/2001 | Packes et al. |
| 6,319,125 | B1 | 11/2001 | Acres |
| 6,336,859 | B2 | 1/2002 | Jones et al. |
| 6,347,996 | B1 | 2/2002 | Gilmore et al. |
| 6,364,314 | B1 | 4/2002 | Canterbury |
| 6,368,216 | B1 | 4/2002 | Hedrick et al. |
| 6,371,852 | B1 | 4/2002 | Acres |
| 6,375,567 | B1 | 4/2002 | Acres |
| 6,425,823 | B1 | 7/2002 | Byrne |
| 6,428,002 | B1 | 8/2002 | Baranauskas |
| 6,443,456 | B1 | 9/2002 | Gajor |
| 6,454,648 | B1 | 9/2002 | Kelly et al. |
| 6,457,045 | B1 | 9/2002 | Hanson et al. |
| 6,471,588 | B2 | 10/2002 | Sakamoto |
| 6,485,367 | B1 | 11/2002 | Joshi |
| 6,485,368 | B2 | 11/2002 | Jones et al. |
| 6,520,856 | B1 | 2/2003 | Walker et al. |
| 6,558,255 | B2 | 5/2003 | Walker et al. |
| 6,565,434 | B1 | 5/2003 | Acres |
| 6,565,436 | B1 | 5/2003 | Baerlocher |
| 6,569,013 | B1 | 5/2003 | Taylor |
| 6,575,832 | B1 | 6/2003 | Manfredi et al. |
| 6,592,457 | B1 | 7/2003 | Frohm et al. |
| 6,599,186 | B1 | 7/2003 | Walker et al. |
| 6,599,193 | B2 | 7/2003 | Baerlocher et al. |
| 6,606,615 | B1 | 8/2003 | Jennings et al. |
| 6,620,046 | B2 | 9/2003 | Rowe |
| 6,634,922 | B1 | 10/2003 | Driscoll et al. |
| 6,648,757 | B1 | 11/2003 | Slomiany et al. |
| 6,652,378 | B2 | 11/2003 | Cannon et al. |
| 6,656,047 | B1 | 12/2003 | Tarantino et al. |
| 6,695,700 | B2 | 2/2004 | Walker et al. |
| 6,697,165 | B2 | 2/2004 | Wakai et al. |
| 6,702,670 | B2 | 3/2004 | Jasper et al. |
| 6,709,331 | B2 | 3/2004 | Berman |
| 6,712,693 | B1 | 3/2004 | Hettinger |
| 6,712,695 | B2 | 3/2004 | Mothwurf et al. |
| 6,722,985 | B2 | 4/2004 | Criss-Puszkiewicz et al. |
| 6,749,510 | B2 | 6/2004 | Giobbi |
| 6,751,657 | B1 | 6/2004 | Zothner |
| 6,755,420 | B2 | 6/2004 | Colton |
| 6,758,754 | B1 | 7/2004 | Lavanchy et al. |
| 6,760,595 | B2 | 7/2004 | Inselberg |
| 6,780,104 | B2 | 8/2004 | Fox |
| 6,786,824 | B2 | 9/2004 | Cannon |
| 6,800,026 | B2 | 10/2004 | Cannon |
| 6,800,027 | B2 | 10/2004 | Giobbi et al. |
| 6,802,778 | B1 | 10/2004 | Lemay et al. |
| 6,811,482 | B2 | 11/2004 | Letovsky |
| 6,811,486 | B1 | 11/2004 | Luciano, Jr. |
| 6,860,808 | B2 | 3/2005 | Levitan |
| 6,860,810 | B2 | 3/2005 | Cannon et al. |
| 6,878,064 | B2 | 4/2005 | Huang |
| 6,939,227 | B2 | 9/2005 | Jorasch et al. |
| 6,939,229 | B2 | 9/2005 | McClintic |
| 6,944,509 | B2 | 9/2005 | Altmaier et al. |
| 6,948,171 | B2 | 9/2005 | Dan et al. |
| 6,965,868 | B1 | 11/2005 | Bednarek |
| 6,973,665 | B2 | 12/2005 | Dudkiewicz et al. |
| RE38,982 | E | 2/2006 | Forte et al. |
| 6,997,380 | B2 | 2/2006 | Safaei et al. |
| 7,037,195 | B2 | 5/2006 | Schneider et al. |

(56) References Cited

U.S. PATENT DOCUMENTS 7,056,210 B2 6/2006 Bansemer et al.
7,069,232 B1 6/2006 Fox et al.
7,090,579 B2 8/2006 Tarantino
7,094,149 B2 8/2006 Walker et al.
7,094,150 B2 8/2006 Ungaro et al.
7,103,560 B1 9/2006 Fox et al.
7,105,736 B2 9/2006 Laakso
7,125,333 B2 10/2006 Brosnan
7,131,908 B2 11/2006 Baerlocher
7,144,322 B2 12/2006 Gomez et al.
7,160,188 B2 1/2007 Kaminkow et al.
7,160,189 B2 1/2007 Walker et al.
7,175,521 B2 2/2007 McClintic
7,182,690 B2 2/2007 Giobbi et al.
7,184,965 B2 2/2007 Fox et al.
7,186,181 B2 3/2007 Rowe
7,192,346 B2 3/2007 Mathis
7,195,243 B2 3/2007 Kenny et al.
7,201,654 B1 4/2007 Jarvis et al.
7,210,998 B2 5/2007 Kazaoka et al.
7,251,805 B2 7/2007 Koo
7,258,613 B2 8/2007 Lucchesi et al.
7,264,243 B2 9/2007 Yoseloff et al.
7,300,351 B2 11/2007 Thomas
7,303,475 B2 12/2007 Britt et al.
7,329,185 B2 2/2008 Conover et al.
7,338,372 B2 3/2008 Morrow et al.
7,355,112 B2 4/2008 Laakso
7,361,089 B2 4/2008 Daly et al.
7,374,486 B2 5/2008 Baerlocher
7,410,422 B2 8/2008 Fine
7,416,186 B2 8/2008 Walker et al.
7,458,892 B2 12/2008 Walker et al.
7,585,222 B2 9/2009 Muir
7,594,849 B2 9/2009 Cannon
7,594,851 B2 9/2009 Falconer
7,601,060 B2 10/2009 Baerlocher et al.
7,628,691 B2 12/2009 Luciano et al.
7,674,180 B2 3/2010 Graham et al.
7,717,788 B2 5/2010 Rowe
7,765,121 B2 7/2010 Pace et al.
7,775,876 B2 8/2010 Rowe
7,780,520 B2 8/2010 Baerlocher
7,806,761 B2 10/2010 Walker et al.
7,811,167 B2 10/2010 Giobbi et al.
7,846,018 B2 12/2010 Baerlocher
7,874,911 B2 1/2011 Walker et al.
7,963,844 B2 6/2011 Walker et al.
7,980,934 B2 7/2011 Shuster et al.
8,047,908 B2 11/2011 Walker et al.
8,052,517 B2 11/2011 Manfredi et al.
8,186,682 B2 5/2012 Amaitis et al.
8,197,324 B2 6/2012 Walker et al.
8,475,254 B2 7/2013 Acres
2001/0004609 A1 6/2001 Walker et al.
2001/0046893 A1 11/2001 Giobbi
2001/0048193 A1 12/2001 Yoseloff et al.
2002/0013173 A1 1/2002 Walker et al.
2002/0016202 A1 2/2002 Fertitta et al.
2002/0019253 A1 2/2002 Reitzen et al.
2002/0032052 A1 3/2002 Levitan
2002/0034981 A1 3/2002 Hisada et al.
2002/0039923 A1 4/2002 Cannon et al.
2002/0055381 A1 5/2002 Tarantino
2002/0082076 A1 6/2002 Roser et al.
2002/0086726 A1 7/2002 Ainsworth
2002/0094855 A1 7/2002 Berman
2002/0103018 A1 8/2002 Rommerdahl et al.
2002/0107072 A1 8/2002 Giobbi
2002/0123376 A1 9/2002 Walker et al.
2002/0132664 A1 9/2002 Miller et al.
2002/0142815 A1 10/2002 Candelore
2002/0142825 A1 10/2002 Lark et al.
2002/0143652 A1 10/2002 Beckett
2002/0147040 A1 10/2002 Walker et al.
2002/0147043 A1 10/2002 Shulman et al.
2002/0152120 A1 10/2002 Howington
2002/0167126 A1 11/2002 De Raedt et al.
2002/0177480 A1 11/2002 Rowe
2002/0177483 A1 11/2002 Cannon
2002/0187834 A1 12/2002 Rowe et al.
2002/0193162 A1 12/2002 Walker et al.
2003/0003989 A1 1/2003 Johnson
2003/0017865 A1 1/2003 Beaulieu et al.
2003/0032474 A1 2/2003 Kaminkow
2003/0036425 A1 2/2003 Kaminkow
2003/0054878 A1 3/2003 Benoy et al.
2003/0054881 A1 3/2003 Hedrick et al.
2003/0060276 A1 3/2003 Walker et al.
2003/0064769 A1 4/2003 Muir
2003/0064771 A1 4/2003 Morrow et al.
2003/0067116 A1 4/2003 Colton
2003/0078101 A1 4/2003 Schneider et al.
2003/0083943 A1 5/2003 Adams et al.
2003/0087685 A1 5/2003 Hogan et al.
2003/0100360 A1 5/2003 Manfredi et al.
2003/0114217 A1 6/2003 Walker et al.
2003/0119575 A1 6/2003 Centuori et al.
2003/0119576 A1 6/2003 McClintic et al.
2003/0130042 A1 7/2003 Ollins
2003/0135304 A1 7/2003 Sroub et al.
2003/0137109 A1 7/2003 Vancura
2003/0144048 A1 7/2003 Silva
2003/0178774 A1 9/2003 Marcilio
2003/0186733 A1 10/2003 Wolf et al.
2003/0187736 A1 10/2003 Teague et al.
2003/0190944 A1 10/2003 Manfredi et al.
2003/0195029 A1 10/2003 Frohm et al.
2003/0199295 A1 10/2003 Vancura
2003/0199312 A1 10/2003 Walker et al.
2003/0204474 A1 10/2003 Capek et al.
2003/0207711 A1 11/2003 Rowe
2003/0209853 A1 11/2003 Harris
2003/0211884 A1 11/2003 Gauselmann
2003/0216169 A1 11/2003 Walker et al.
2003/0220138 A1 11/2003 Walker et al.
2003/0220139 A1 11/2003 Peterson
2003/0220143 A1 11/2003 Shteyn et al.
2003/0228901 A1 12/2003 Walker et al.
2003/0232640 A1 12/2003 Walker et al.
2003/0234489 A1 12/2003 Okada
2003/0236110 A1 12/2003 Beaulieu et al.
2004/0002388 A1 1/2004 Larsen et al.
2004/0009808 A1 1/2004 Gauselmann
2004/0038735 A1 2/2004 Steil et al.
2004/0038736 A1 2/2004 Bryant et al.
2004/0048650 A1 3/2004 Mierau et al.
2004/0053657 A1 3/2004 Fiden et al.
2004/0053681 A1 3/2004 Jordan et al.
2004/0063484 A1 4/2004 Dreaper et al.
2004/0072609 A1 4/2004 Ungaro et al.
2004/0103013 A1 5/2004 Jameson
2004/0121833 A1 6/2004 Mezen et al.
2004/0142742 A1 7/2004 Schneider et al.
2004/0158536 A1 8/2004 Kowal et al.
2004/0166940 A1 8/2004 Rothschild
2004/0180722 A1 9/2004 Giobbi
2004/0198485 A1 10/2004 Loose et al.
2004/0203611 A1 10/2004 Laporta et al.
2004/0204213 A1 10/2004 Schugar et al.
2004/0204216 A1 10/2004 Schugar
2004/0204222 A1 10/2004 Roberts
2004/0214637 A1 10/2004 Nonaka
2004/0219967 A1 11/2004 Giobbi et al.
2004/0224750 A1 11/2004 Al-Ziyoud
2004/0229671 A1 11/2004 Stronach et al.
2004/0229683 A1 11/2004 Mothwurf et al.
2004/0229700 A1 11/2004 Cannon et al.
2004/0235542 A1 11/2004 Stronach et al.
2004/0248642 A1 12/2004 Rothschild
2004/0254010 A1 12/2004 Fine
2004/0266517 A1 12/2004 Bleich et al.
2005/0014558 A1 1/2005 Estey
2005/0026674 A1 2/2005 Wolf et al.

(56) References Cited

U.S. PATENT DOCUMENTS

| | | | | |
|---|---|---|---|---|
| 2005/0043072 | A1 | 2/2005 | Nelson | |
| 2005/0043088 | A1 | 2/2005 | Nguyen et al. | |
| 2005/0043092 | A1 | 2/2005 | Gauselmann | |
| 2005/0043094 | A1 | 2/2005 | Nguyen et al. | |
| 2005/0049028 | A1 | 3/2005 | Gornez et al. | |
| 2005/0054438 | A1 | 3/2005 | Rothschild et al. | |
| 2005/0059467 | A1 | 3/2005 | Saffari et al. | |
| 2005/0070356 | A1 | 3/2005 | Mothwurf et al. | |
| 2005/0075164 | A1 | 4/2005 | Krynicky | |
| 2005/0096121 | A1 | 5/2005 | Gilliland et al. | |
| 2005/0096124 | A1 | 5/2005 | Stronach | |
| 2005/0101375 | A1 | 5/2005 | Webb et al. | |
| 2005/0101379 | A1 | 5/2005 | Falconer | |
| 2005/0119052 | A1 | 6/2005 | Russell et al. | |
| 2005/0124411 | A1 | 6/2005 | Schneider et al. | |
| 2005/0124415 | A1 | 6/2005 | Centuori et al. | |
| 2005/0148380 | A1 | 7/2005 | Cannon et al. | |
| 2005/0148383 | A1 | 7/2005 | Mayeroff | |
| 2005/0153773 | A1 | 7/2005 | Nguyen et al. | |
| 2005/0164764 | A1 | 7/2005 | Ghaly | |
| 2005/0181856 | A1 | 8/2005 | Cannon et al. | |
| 2005/0181860 | A1 | 8/2005 | Nguyen et al. | |
| 2005/0181862 | A1 | 8/2005 | Asher et al. | |
| 2005/0187014 | A1 | 8/2005 | Saffari et al. | |
| 2005/0208995 | A1 | 9/2005 | Marshall et al. | |
| 2005/0215311 | A1 | 9/2005 | Hornik et al. | |
| 2005/0215314 | A1 | 9/2005 | Schneider et al. | |
| 2005/0215316 | A1 | 9/2005 | Rowe et al. | |
| 2005/0227760 | A1 | 10/2005 | Viazny et al. | |
| 2005/0233794 | A1 | 10/2005 | Cannon et al. | |
| 2005/0239541 | A1 | 10/2005 | Jorasch et al. | |
| 2005/0239545 | A1 | 10/2005 | Rowe | |
| 2005/0251440 | A1 | 11/2005 | Bednarek | |
| 2005/0255902 | A1 | 11/2005 | Lind | |
| 2005/0266905 | A1 | 12/2005 | Emori et al. | |
| 2006/0009284 | A1 | 1/2006 | Schwartz et al. | |
| 2006/0025205 | A1 | 2/2006 | Casey et al. | |
| 2006/0025207 | A1 | 2/2006 | Walker et al. | |
| 2006/0025210 | A1 | 2/2006 | Johnson | |
| 2006/0030400 | A1 | 2/2006 | Mathis | |
| 2006/0040723 | A1 | 2/2006 | Baerlocher et al. | |
| 2006/0040730 | A1* | 2/2006 | Walker et al. | 463/20 |
| 2006/0046830 | A1 | 3/2006 | Webb | |
| 2006/0046835 | A1 | 3/2006 | Walker et al. | |
| 2006/0052153 | A1 | 3/2006 | Viazny et al. | |
| 2006/0052160 | A1 | 3/2006 | Saffari et al. | |
| 2006/0058095 | A1 | 3/2006 | Berman et al. | |
| 2006/0058097 | A1 | 3/2006 | Berman et al. | |
| 2006/0068898 | A1 | 3/2006 | Maya | |
| 2006/0068903 | A1 | 3/2006 | Walker et al. | |
| 2006/0073872 | A1 | 4/2006 | B-Jensen et al. | |
| 2006/0073887 | A1 | 4/2006 | Nguyen et al. | |
| 2006/0079310 | A1 | 4/2006 | Friedman et al. | |
| 2006/0079314 | A1 | 4/2006 | Walker et al. | |
| 2006/0084496 | A1 | 4/2006 | Jaffe et al. | |
| 2006/0094493 | A1 | 5/2006 | Kido | |
| 2006/0100009 | A1 | 5/2006 | Walker et al. | |
| 2006/0105836 | A1 | 5/2006 | Walker et al. | |
| 2006/0116201 | A1 | 6/2006 | Gauselmann | |
| 2006/0121972 | A1 | 6/2006 | Walker et al. | |
| 2006/0128467 | A1 | 6/2006 | Thomas | |
| 2006/0135249 | A1 | 6/2006 | Seelig et al. | |
| 2006/0148559 | A1 | 7/2006 | Jordan et al. | |
| 2006/0149632 | A1 | 7/2006 | Register et al. | |
| 2006/0154714 | A1 | 7/2006 | Montross et al. | |
| 2006/0160598 | A1 | 7/2006 | Wells et al. | |
| 2006/0160610 | A1 | 7/2006 | Potts | |
| 2006/0174270 | A1 | 8/2006 | Westberg et al. | |
| 2006/0183530 | A1 | 8/2006 | Ellis | |
| 2006/0183536 | A1 | 8/2006 | Gagner et al. | |
| 2006/0199631 | A1 | 9/2006 | McGill et al. | |
| 2006/0211486 | A1 | 9/2006 | Walker et al. | |
| 2006/0211496 | A1 | 9/2006 | Manz | |
| 2006/0217175 | A1 | 9/2006 | Walker et al. | |
| 2006/0229127 | A1 | 10/2006 | Walker et al. | |
| 2006/0237905 | A1 | 10/2006 | Nicely et al. | |
| 2006/0240890 | A1 | 10/2006 | Walker et al. | |
| 2006/0247031 | A1 | 11/2006 | Walker et al. | |
| 2006/0247034 | A1 | 11/2006 | Schneider et al. | |
| 2006/0247041 | A1 | 11/2006 | Walker et al. | |
| 2006/0252510 | A1 | 11/2006 | Walker et al. | |
| 2006/0252512 | A1 | 11/2006 | Walker et al. | |
| 2006/0252519 | A1 | 11/2006 | Walker et al. | |
| 2006/0258422 | A1 | 11/2006 | Walker et al. | |
| 2006/0258425 | A1 | 11/2006 | Edidin et al. | |
| 2006/0258432 | A1 | 11/2006 | Packer et al. | |
| 2006/0287034 | A1 | 12/2006 | Englman et al. | |
| 2006/0287045 | A1 | 12/2006 | Walker et al. | |
| 2006/0287075 | A1 | 12/2006 | Walker et al. | |
| 2006/0287098 | A1 | 12/2006 | Morrow et al. | |
| 2006/0287102 | A1 | 12/2006 | White et al. | |
| 2007/0001396 | A1 | 1/2007 | Walker et al. | |
| 2007/0010309 | A1 | 1/2007 | Giobbi et al. | |
| 2007/0010315 | A1 | 1/2007 | Hein | |
| 2007/0015564 | A1 | 1/2007 | Walker et al. | |
| 2007/0049369 | A1 | 3/2007 | Kuhn et al. | |
| 2007/0050256 | A1 | 3/2007 | Walker et al. | |
| 2007/0060252 | A1 | 3/2007 | Taylor | |
| 2007/0060254 | A1 | 3/2007 | Muir | |
| 2007/0060274 | A1 | 3/2007 | Rowe et al. | |
| 2007/0060295 | A1 | 3/2007 | DeMar et al. | |
| 2007/0060323 | A1 | 3/2007 | Isaac et al. | |
| 2007/0060334 | A1 | 3/2007 | Rowe | |
| 2007/0060387 | A1 | 3/2007 | Enzminger et al. | |
| 2007/0066377 | A1 | 3/2007 | Asdale | |
| 2007/0087822 | A1 | 4/2007 | Van Luchene | |
| 2007/0105612 | A1 | 5/2007 | Fotevski | |
| 2007/0105615 | A1 | 5/2007 | Lind | |
| 2007/0105618 | A1 | 5/2007 | Steil | |
| 2007/0106553 | A1 | 5/2007 | Jordan et al. | |
| 2007/0111772 | A1 | 5/2007 | Shuster et al. | |
| 2007/0111776 | A1 | 5/2007 | Griswold et al. | |
| 2007/0112609 | A1 | 5/2007 | Howard et al. | |
| 2007/0117619 | A1 | 5/2007 | Walker et al. | |
| 2007/0117623 | A1 | 5/2007 | Nelson et al. | |
| 2007/0129147 | A1 | 6/2007 | Gagner | |
| 2007/0135214 | A1 | 6/2007 | Walker et al. | |
| 2007/0143156 | A1 | 6/2007 | van Deursen | |
| 2007/0167210 | A1 | 7/2007 | Kelly et al. | |
| 2007/0180371 | A1 | 8/2007 | Kammler | |
| 2007/0184896 | A1 | 8/2007 | Dickerson | |
| 2007/0191087 | A1 | 8/2007 | Thomas et al. | |
| 2007/0197247 | A1 | 8/2007 | Inselberg | |
| 2007/0205556 | A1 | 9/2007 | Roemer et al. | |
| 2007/0218974 | A1 | 9/2007 | Patel et al. | |
| 2007/0254732 | A1 | 11/2007 | Walker et al. | |
| 2007/0259709 | A1 | 11/2007 | Kelly et al. | |
| 2007/0275777 | A1 | 11/2007 | Walker et al. | |
| 2007/0281775 | A1 | 12/2007 | Kashima | |
| 2008/0015004 | A1 | 1/2008 | Gatto et al. | |
| 2008/0026826 | A1 | 1/2008 | Groswirt | |
| 2008/0039190 | A1 | 2/2008 | Walker et al. | |
| 2008/0058105 | A1 | 3/2008 | Combs et al. | |
| 2008/0064495 | A1 | 3/2008 | Bryant et al. | |
| 2008/0070695 | A1 | 3/2008 | Baerlocher et al. | |
| 2008/0076576 | A1 | 3/2008 | Graham et al. | |
| 2008/0090651 | A1 | 4/2008 | Baerlocher | |
| 2008/0096632 | A1 | 4/2008 | Okada | |
| 2008/0096636 | A1 | 4/2008 | Power | |
| 2008/0102921 | A1 | 5/2008 | Urquhart | |
| 2008/0102935 | A1 | 5/2008 | Finnimore | |
| 2008/0102946 | A1 | 5/2008 | Amour | |
| 2008/0113749 | A1 | 5/2008 | Williams et al. | |
| 2008/0113777 | A1 | 5/2008 | Anderson | |
| 2008/0113779 | A1 | 5/2008 | Cregan | |
| 2008/0113811 | A1 | 5/2008 | Linard et al. | |
| 2008/0132320 | A1 | 6/2008 | Rodgers | |
| 2008/0132328 | A1 | 6/2008 | Yoshioka | |
| 2008/0146331 | A1 | 6/2008 | Nordman et al. | |
| 2008/0153564 | A1 | 6/2008 | Baerlocher et al. | |
| 2008/0153580 | A1 | 6/2008 | Beadell et al. | |
| 2008/0161085 | A1 | 7/2008 | Hansen | |
| 2008/0161099 | A1 | 7/2008 | Sines et al. | |
| 2008/0171586 | A1 | 7/2008 | Roemer | |

(56) References Cited

U.S. PATENT DOCUMENTS

| | | | | |
|---|---|---|---|---|
| 2008/0176647 | A1 | 7/2008 | Acres | |
| 2008/0182655 | A1 | 7/2008 | DeWaal et al. | |
| 2008/0207313 | A1 | 8/2008 | Acres | |
| 2008/0214286 | A1* | 9/2008 | Lutnick et al. | 463/25 |
| 2008/0220861 | A1 | 9/2008 | Okada | |
| 2008/0234035 | A1 | 9/2008 | Malek | |
| 2008/0242394 | A1 | 10/2008 | Sakuma | |
| 2008/0242398 | A1 | 10/2008 | Harris et al. | |
| 2008/0248851 | A1 | 10/2008 | Bloom | |
| 2008/0254886 | A1 | 10/2008 | Kelly | |
| 2008/0261699 | A1 | 10/2008 | Topham et al. | |
| 2008/0268959 | A1 | 10/2008 | Bryson et al. | |
| 2008/0280674 | A1 | 11/2008 | Sakuma | |
| 2008/0287186 | A1 | 11/2008 | Sakuma | |
| 2008/0293467 | A1 | 11/2008 | Mathis | |
| 2008/0318656 | A1 | 12/2008 | Walker et al. | |
| 2009/0005170 | A9 | 1/2009 | Kelly et al. | |
| 2009/0036202 | A1 | 2/2009 | Baerlocher et al. | |
| 2009/0070081 | A1 | 3/2009 | Saenz et al. | |
| 2009/0075728 | A1 | 3/2009 | Acres | |
| 2009/0088239 | A1 | 4/2009 | Iddings et al. | |
| 2009/0117981 | A1 | 5/2009 | Yoshizawa | |
| 2009/0124327 | A1 | 5/2009 | Caputo et al. | |
| 2009/0124364 | A1 | 5/2009 | Cuddy et al. | |
| 2009/0131175 | A1 | 5/2009 | Kelly et al. | |
| 2009/0137312 | A1 | 5/2009 | Walker et al. | |
| 2009/0170608 | A1 | 7/2009 | Herrmann et al. | |
| 2009/0176580 | A1 | 7/2009 | Herrmann et al. | |
| 2009/0233682 | A1 | 9/2009 | Kato et al. | |
| 2009/0239601 | A1 | 9/2009 | Macke | |
| 2009/0239622 | A1 | 9/2009 | Fujimori et al. | |
| 2009/0239628 | A1 | 9/2009 | Fujimori et al. | |
| 2009/0247284 | A1 | 10/2009 | Sugiyama et al. | |
| 2009/0253477 | A1 | 10/2009 | Teranishi | |
| 2009/0253478 | A1 | 10/2009 | Walker et al. | |
| 2009/0253490 | A1 | 10/2009 | Teranishi | |
| 2009/0270168 | A1 | 10/2009 | Englman et al. | |
| 2009/0286590 | A1 | 11/2009 | Bennett | |
| 2009/0325669 | A1 | 12/2009 | Kelly et al. | |
| 2009/0325670 | A1 | 12/2009 | Kelly et al. | |
| 2010/0016055 | A1 | 1/2010 | Englman | |
| 2010/0041464 | A1 | 2/2010 | Arezina et al. | |
| 2010/0048286 | A1 | 2/2010 | Okada et al. | |
| 2010/0056248 | A1 | 3/2010 | Acres | |
| 2010/0075741 | A1 | 3/2010 | Aoki et al. | |
| 2010/0105454 | A1 | 4/2010 | Weber et al. | |
| 2010/0105466 | A1 | 4/2010 | Inamura et al. | |
| 2010/0113130 | A1 | 5/2010 | Kamano et al. | |
| 2010/0124981 | A1 | 5/2010 | Kato et al. | |
| 2010/0130280 | A1 | 5/2010 | Arezina | |
| 2010/0285867 | A1 | 11/2010 | Okada | |
| 2010/0304834 | A1 | 12/2010 | Okada | |
| 2011/0039615 | A1 | 2/2011 | Acres et al. | |
| 2011/0053675 | A1 | 3/2011 | Aoki et al. | |
| 2011/0081958 | A1 | 4/2011 | Herrmann et al. | |
| 2011/0117987 | A1 | 5/2011 | Aoki et al. | |
| 2011/0165938 | A1 | 7/2011 | Anderson et al. | |
| 2011/0183753 | A1 | 7/2011 | Acres et al. | |
| 2011/0218030 | A1 | 9/2011 | Acres | |
| 2011/0275438 | A9 | 11/2011 | Hardy et al. | |
| 2011/0281632 | A1 | 11/2011 | Okada | |
| 2011/0287826 | A1 | 11/2011 | Kato et al. | |
| 2011/0294563 | A1 | 12/2011 | Jaffe | |
| 2012/0077565 | A1 | 3/2012 | Barbalet | |
| 2012/0115566 | A1 | 5/2012 | Fujisawa et al. | |
| 2012/0172108 | A1 | 7/2012 | Acres | |
| 2012/0172130 | A1 | 7/2012 | Acres | |
| 2012/0190425 | A1 | 7/2012 | Barbalet | |

FOREIGN PATENT DOCUMENTS

| | | | |
|---|---|---|---|
| EP | 896304 | | 2/1999 |
| EP | 896308 | | 2/1999 |
| EP | 919965 | | 6/1999 |
| EP | 981397 | | 3/2000 |
| EP | 1091789 | | 4/2001 |
| EP | 1170041 | A2 | 1/2002 |
| EP | 1231577 | | 8/2002 |
| EP | 1351180 | | 10/2003 |
| EP | 1369830 | | 12/2003 |
| EP | 1490849 | | 12/2004 |
| EP | 1496419 | | 1/2005 |
| EP | 1623375 | | 2/2006 |
| EP | 1637196 | | 3/2006 |
| EP | 1832952 | | 9/2007 |
| EP | 1 938 872 | A2 | 7/2008 |
| JP | 2-21883 | | 1/1990 |
| WO | 95/21665 | | 8/1995 |
| WO | 95/31262 | | 11/1995 |
| WO | 96/35490 | | 11/1996 |
| WO | 97/46293 | | 12/1997 |
| WO | 00/17825 | | 3/2000 |
| WO | 00/32286 | | 6/2000 |
| WO | 00/64545 | | 11/2000 |
| WO | 01/36059 | | 5/2001 |
| WO | 01/59680 | | 8/2001 |
| WO | 01/80961 | | 11/2001 |
| WO | 03/066179 | | 8/2003 |
| WO | 03/089092 | | 10/2003 |
| WO | 2005029279 | A2 | 3/2005 |
| WO | 2005029287 | A2 | 3/2005 |
| WO | 2005/099845 | | 10/2005 |
| WO | 2005099841 | A1 | 10/2005 |
| WO | 2005/113093 | | 12/2005 |
| WO | 2006/014745 | | 2/2006 |
| WO | 2006/014770 | | 2/2006 |
| WO | 2006/014990 | | 2/2006 |
| WO | 2006/032498 | | 3/2006 |
| WO | 2006/036948 | | 4/2006 |
| WO | 2006/055518 | | 5/2006 |
| WO | 2006/060442 | | 6/2006 |
| WO | 2006/060493 | | 6/2006 |
| WO | 2006104731 | A2 | 10/2006 |
| WO | 2006121663 | A2 | 11/2006 |
| WO | 2006135608 | A2 | 12/2006 |
| WO | 2007/087286 | | 8/2007 |
| WO | 2008024556 | | 2/2008 |
| WO | 2008024556 | A2 | 2/2008 |
| WO | 2008024705 | A2 | 2/2008 |
| WO | 2008027429 | A2 | 3/2008 |

OTHER PUBLICATIONS

Acres, John: "Measuring the Player Experience: What a Squiggly Line Can Tell You", Inside Edge/Slot Manager, Jan.-Feb. 2009, pp. 28-29.

Acres, John: "The Future of Gaming, Where Will You be in 10 Years?", Slot Operations Management/Casino Enterprise Management, Jul. 2007, pp. 8-10, 12.

"White Paper: An Analysis of Harrah's Total Rewards Players Rewards Program" written and published by Gaming Market Advisor on or before Dec. 31, 2006, retrieved from URL <http://www.gamingmarketadvisors.com/publications/Harrahs%20Total%20Rewards%20White%20Paper.pdf>, 41 pages.

Acres, John, An Ingenious Internet Marketing Tool, Slot Operations Management / Casino Enterprise Management, Aug. 2007, pp. 8-10.

* cited by examiner

GAMING DEVICE HAVING VARIABLE SPEED OF PLAY

CROSS-REFERENCE TO RELATED APPLICATIONS

This application is a divisional application of prior application Ser. No. 12/204,633 filed Sep. 4, 2008, titled GAMING DEVICE HAVING VARIABLE SPEED OF PLAY WITH PERSONALITY, which is hereby incorporated by reference.

The following applications also claim the benefit of application Ser. No. 12/204,633: application Ser. No. 12/574,565 filed Oct. 6, 2009, titled POKER GAMING DEVICE HAVING VARIABLE SPEED OF PLAY (now abandoned) and application Ser. No. 13/425,672 filed Mar. 21, 2012, titled GAMING DEVICE HAVING VARIABLE SPEED OF PLAY.

FIELD OF THE INVENTION

This disclosure relates generally to gaming devices, and more particularly to gaming devices configured to vary the speed of game play, as well as methods of operating gaming devices to vary the speed of game play.

BACKGROUND

Gambling sessions typically include various winning gaming results and numerous losing gaming results that are each displayed on a gaming device. Since a portion of the winning gaming results are much larger in value than the wagers placed to reach those results, and because the overall payback percentage of the gaming device must be less than 100% to pay for the administrative costs of operating the gaming device, these gambling sessions usually include many more losing gaming results than winning gaming results.

As a consequence of this dichotomy, a great portion of time on a gaming device is spent watching reels spin (or poker hands played) with a resulting loss. For most players, the excitement and gratification of gambling is tied to achieving wins. While these players will endure certain periods of loss, players will often press the spin and/or bet buttons as quickly as possible to pass through the losses to get to another win. While it is in a casinos interest to provide as much excitement and entertainment as possible to its players, the casino must also limit the number of wins in order to cover costs and return a profit, which effectively limits how many wins can be paid to a player.

In all of today's games, losses take nearly as long as wins to display. While there is sometimes player anticipation tied to showing several reels with a particular symbol on a payline (or showing multiple cards needed for a large win in video poker) where the gaming result ultimately ends in a loss, most of the time it is quickly evident to the player that they have little or no chance of receiving a winning outcome. Once the player realizes that the current game will result in a loss, the player either has to wait for the remaining reels to come to rest or can sometimes "slam" the rest of the reels to a stop by hitting the spin button again before waiting for the game to reset and being able to initiate another game. Thus, with conventional gaming devices, players often spend a least half of their gambling sessions going through losing gaming results.

DETAILED DESCRIPTION

Figure 1A:
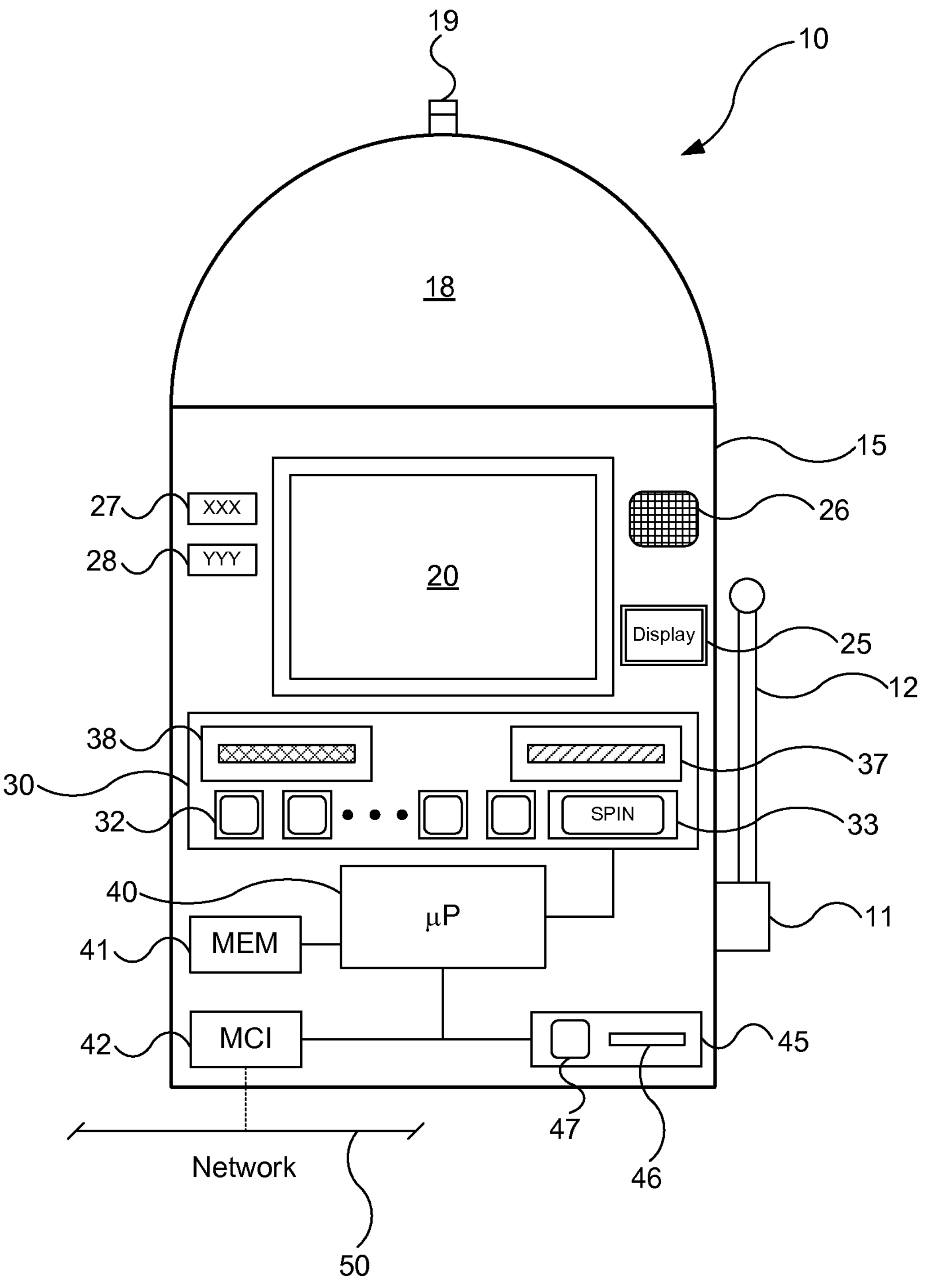
FIG. 1A is a functional block diagram that illustrates a gaming device according to embodiments of the invention.
Figure 1B:
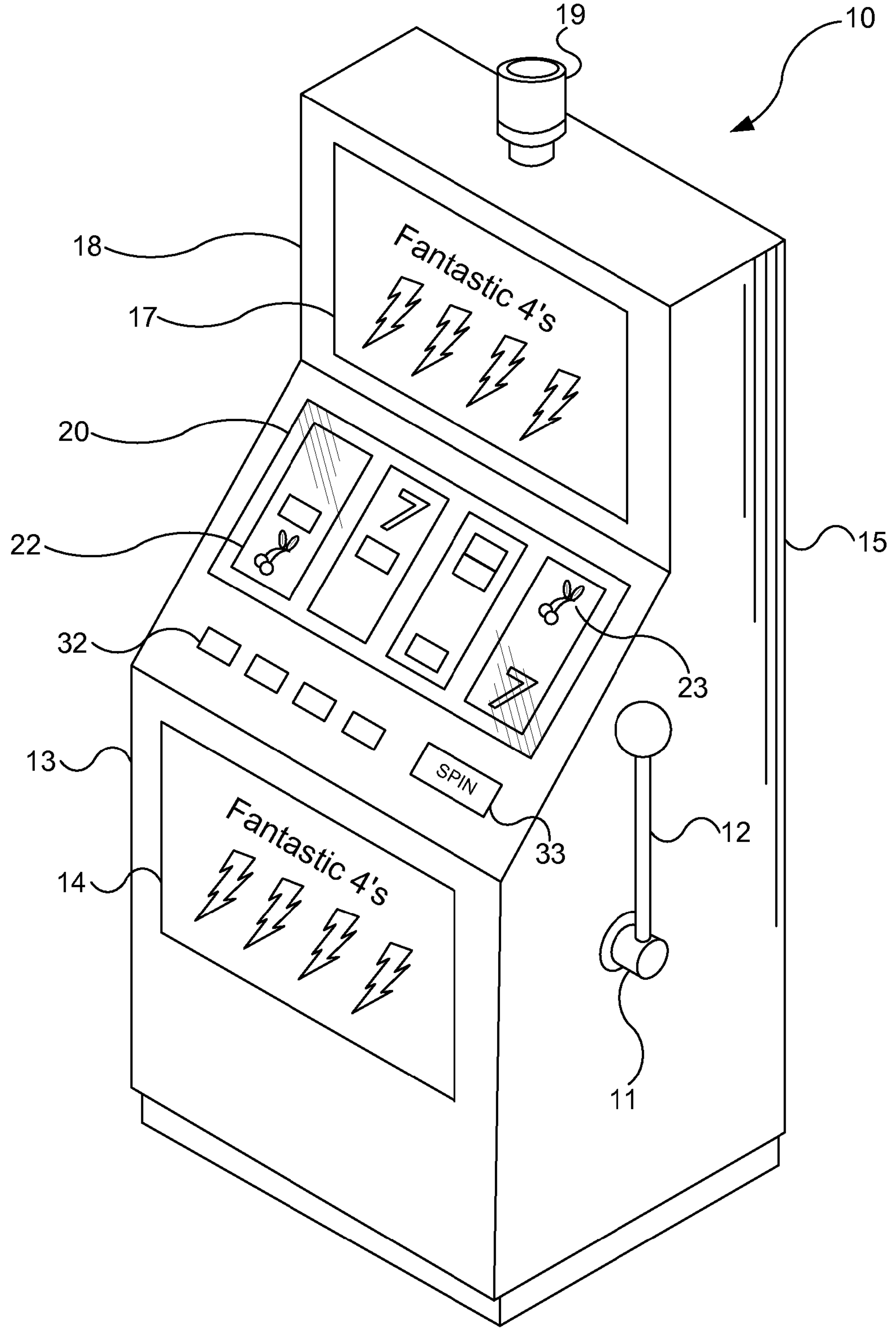
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3A. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
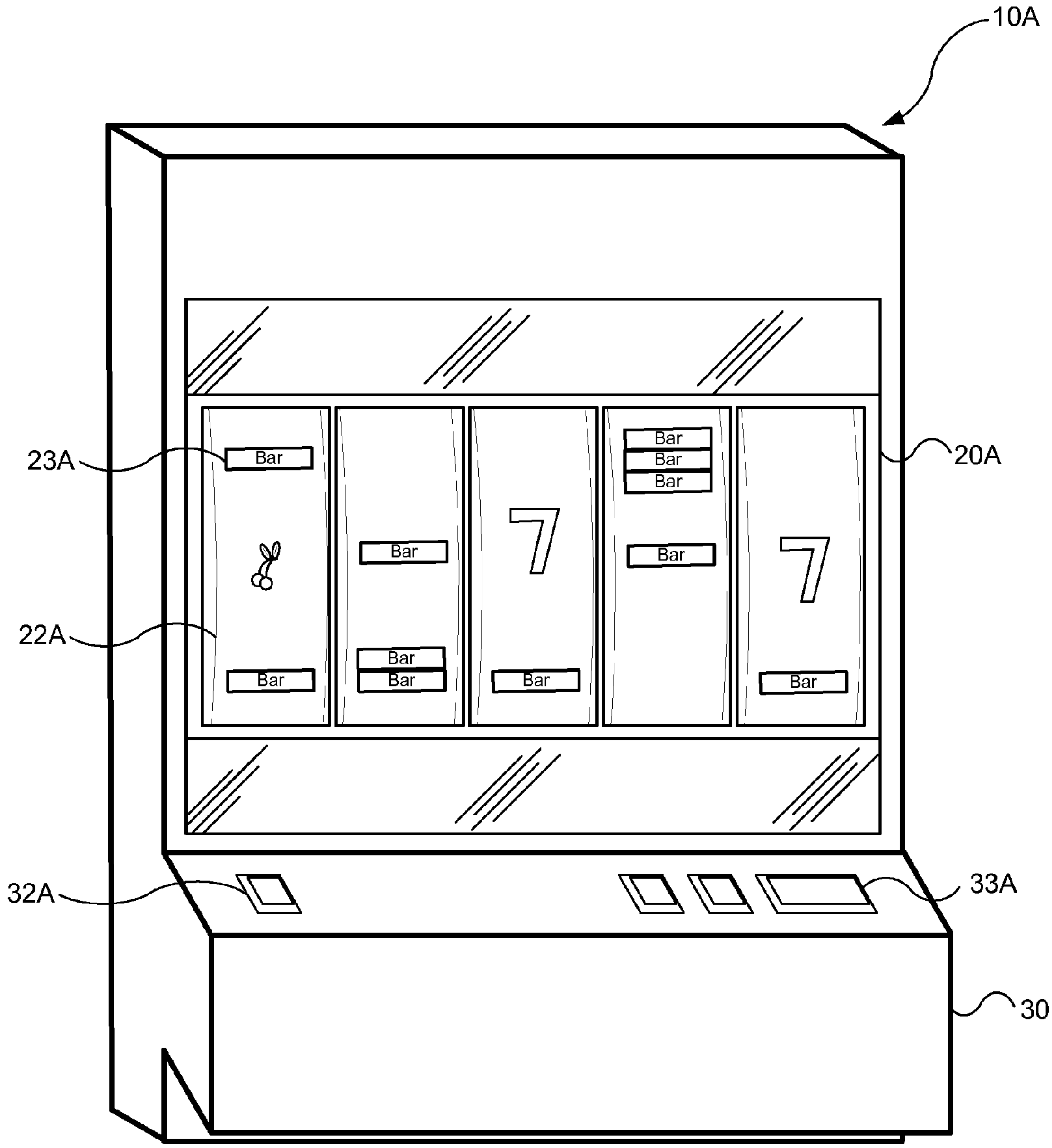
FIGS. 2A, 2B, and 2C are detail diagrams of exemplary types of gaming devices according to embodiments of the invention.
Figure 2B:
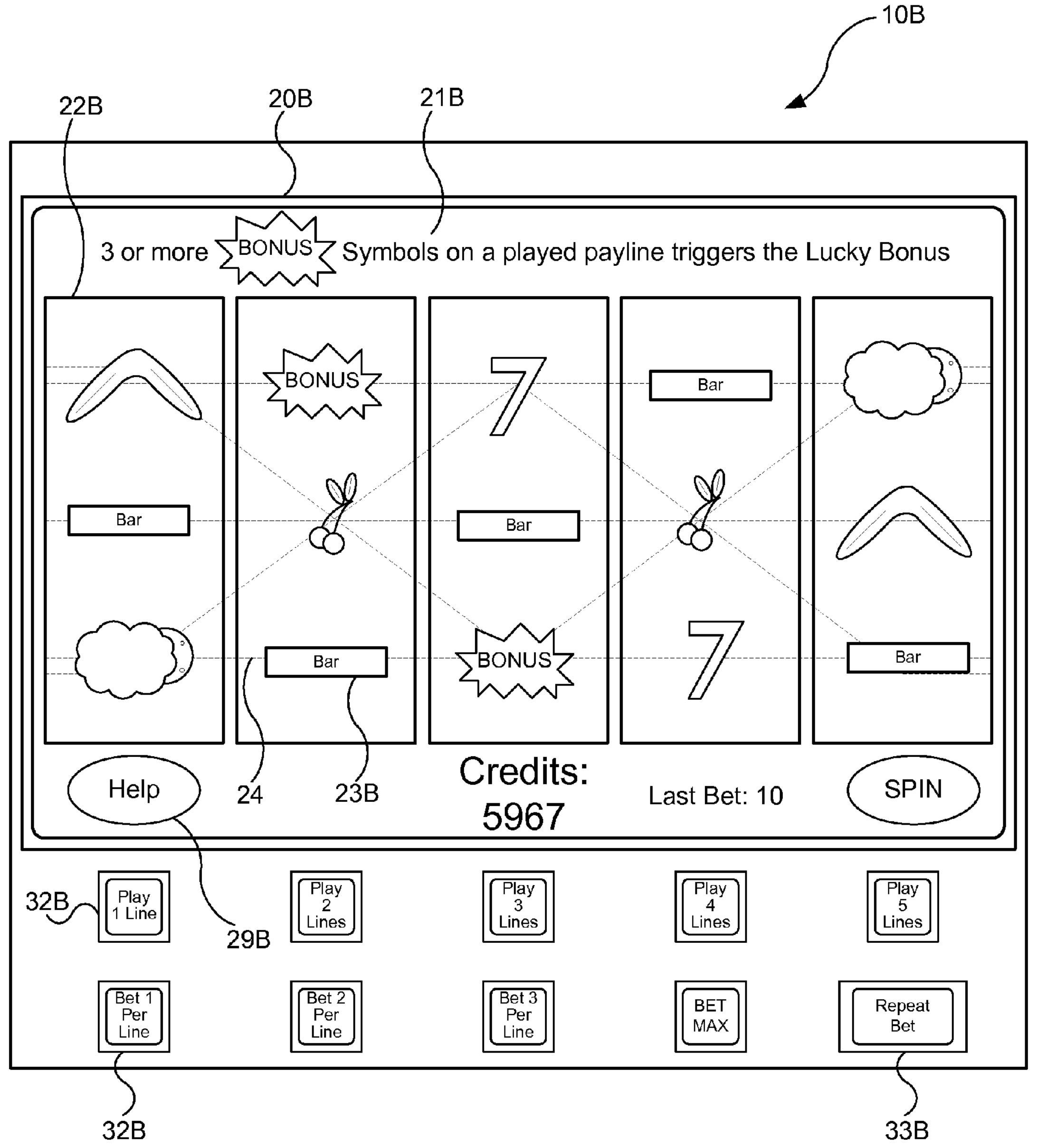
Figure 2C:
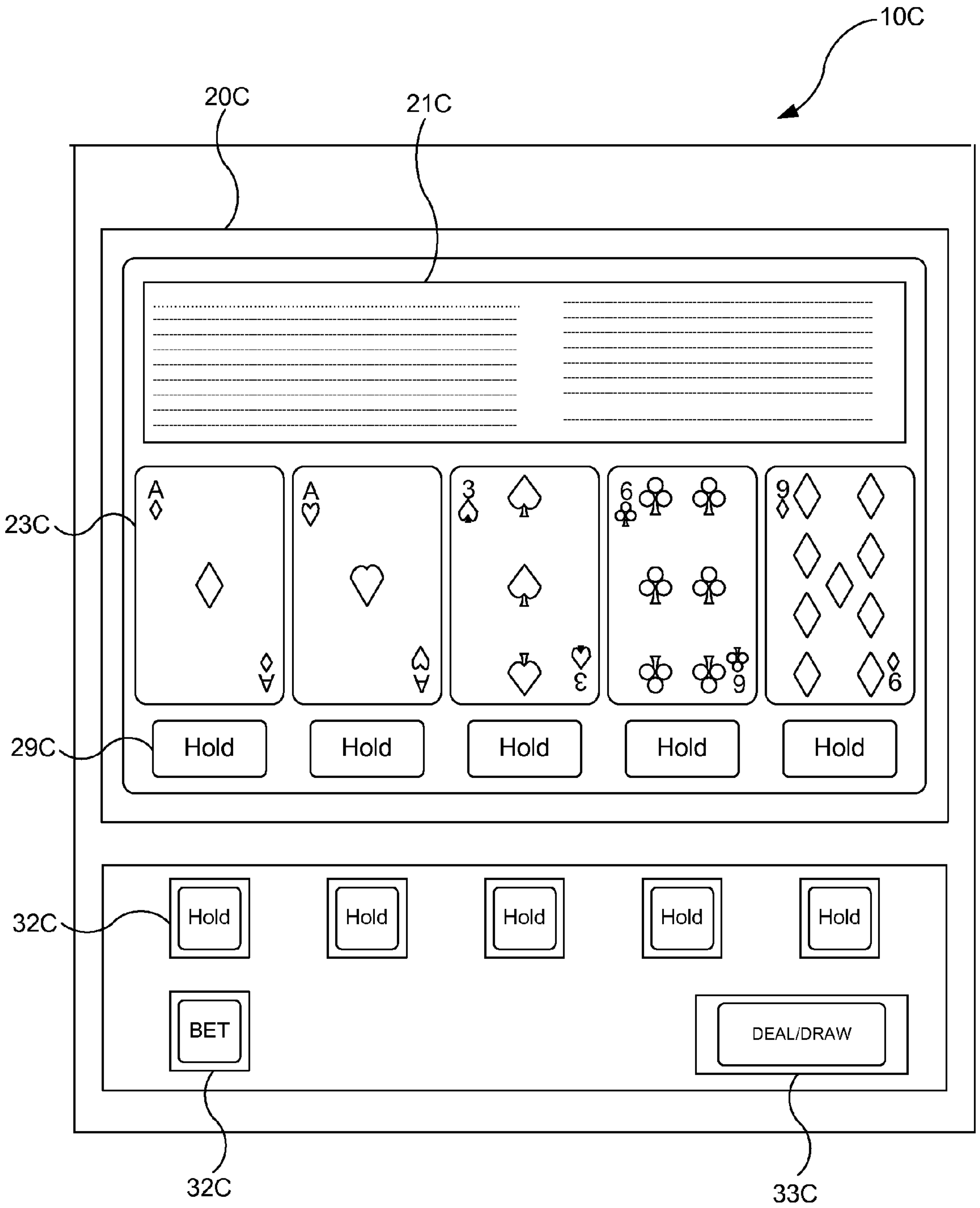

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3AC shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3A:
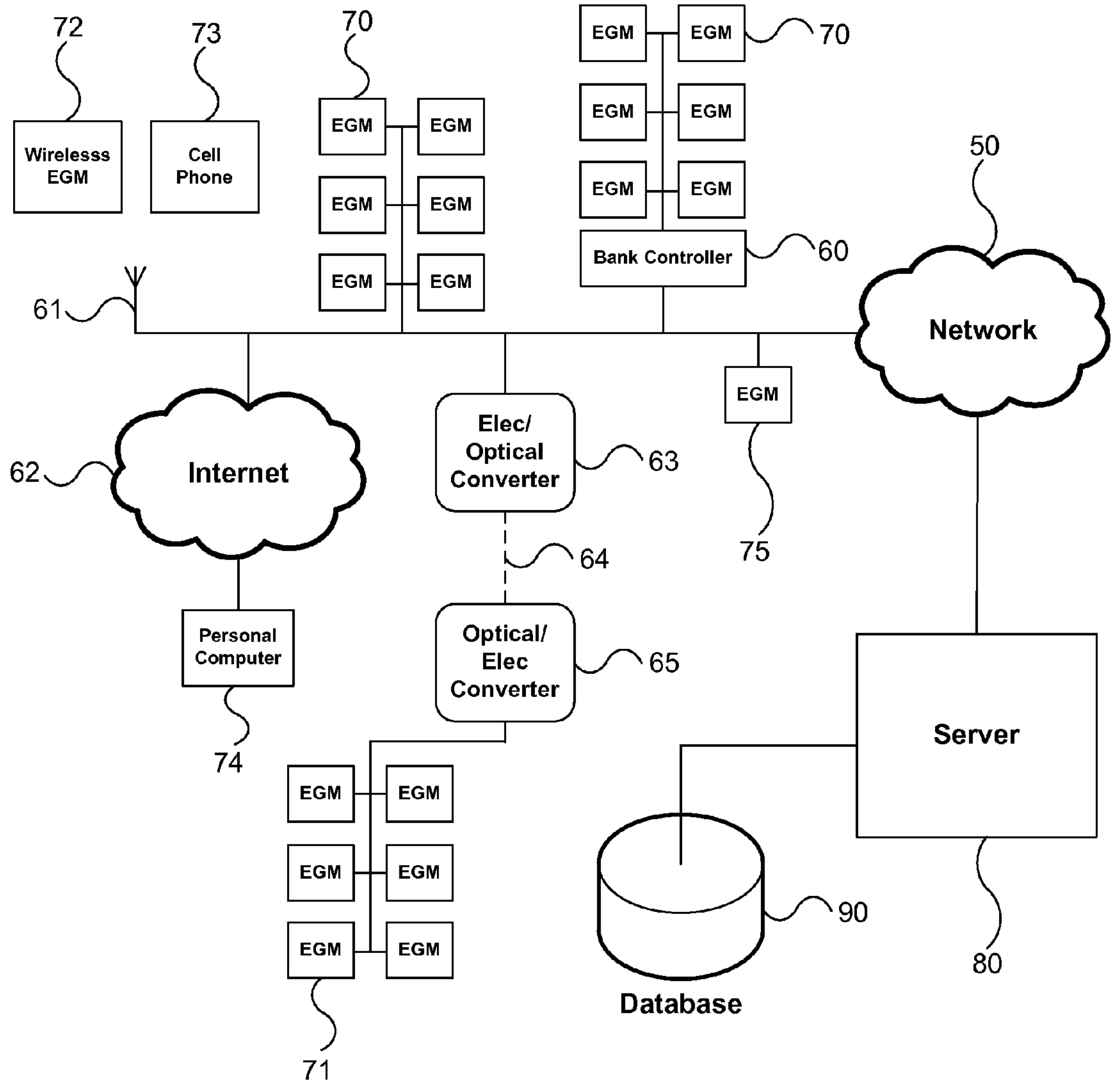
FIG. 3A is a functional block diagram of networked gaming devices according to embodiments of the invention.

FIG. 3A is a block diagram illustrating networked gaming devices according to embodiments of the invention. Referring to FIG. 3A, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3A, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

As discussed above, players often spend much of their gaming time passing through losses to reach more exciting wins. One way to improve the appeal of gaming machines is to sell games, not as individual transactions, but as a sequence or session of transactions in which a new transaction or gaming event is automatically initiated immediately after completion of a prior one to more quickly reach winning outcomes. Embodiments of this concept are directed to gaming devices configured to vary the speed of game play, as well as methods of operating gaming devices to vary the speed of game play.

As discussed below, varying the speed of game play can be embodied in many different formats across different gaming platforms. Some of these embodiments vary the game speed by rapidly playing through losing gaming events and automatically initiating a subsequent gaming event without further player interaction. As wins and bonuses are more exciting events for a player, gaming events with winning outcomes may be conducted over a longer period of time so that the player can enjoy the win. Since losses make up a large part of gaming results as discussed above, overall game speed is significantly increased. These and other features of the present concept are discussed more fully below in exemplary embodiments, which are discussed with reference to the drawings.

Figure 3B:
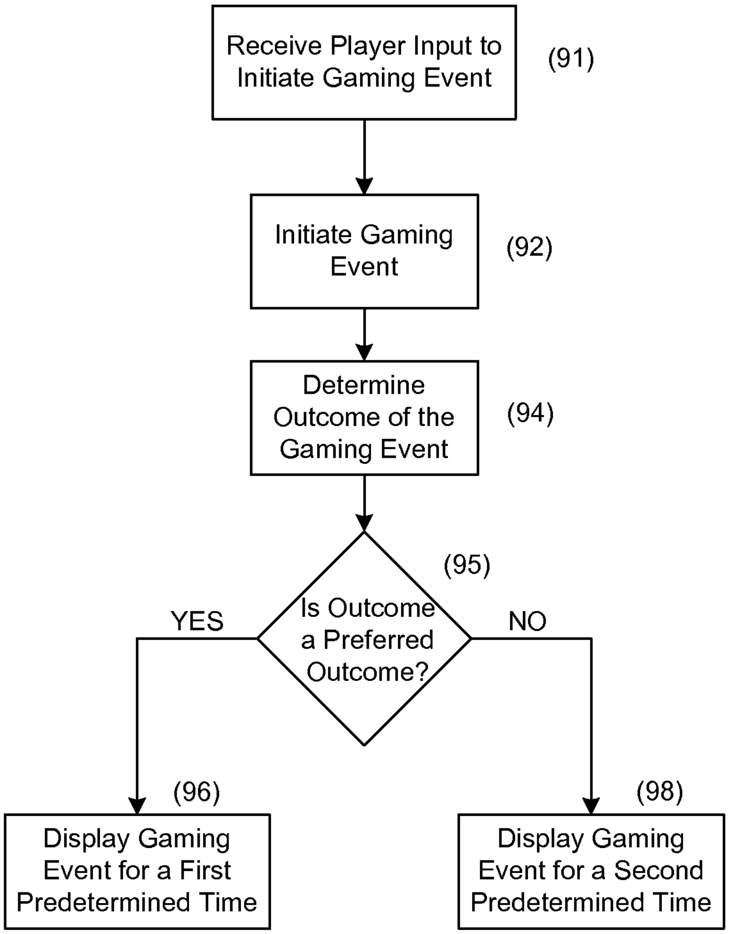
FIG. 3B is a flow diagram of a method of operating a gaming device according to embodiments of the invention.

FIG. 3B is a flow diagram of a method of operating a gaming device according to embodiments of the invention.

Referring to FIG. 3B, a gaming device 10 (FIG. 1B) may be operated to play a game of chance by receiving a player input to initiate a gaming event (91). After such an input is received, the gaming device 10 may initiate the gaming event (92) and determine the outcome of the gaming event (94). Subsequently, the gaming device 10 may determine whether the outcome is a preferred outcome (95). As mentioned above, a preferred outcome may be an outcome corresponding to a monetary award, an outcome corresponding to an award larger than a predetermined value, an outcome that triggers a bonus game, or the like. If the outcome is a preferred outcome, the gaming device 10 may display the gaming event for a first predetermined time (96). If the outcome is not a preferred outcome, the gaming device 10 may display the gaming event for a second predetermined time (98).

To illustrate this feature, imagine, for example, a three reel video slot machine, where a preferred outcome is defined as any win greater than five credits. After a gaming event has been initiated by a player, the outcome of the gaming event is quickly determined by analyzing a selected output from an RNG. If the outcome of the gaming event is determined to be a losing outcome (or any outcome up to five credits), the three game reels quickly spin and stop substantially simultaneously. The total time from the player initiating the gaming event to the display of the final outcome of the gaming event for this losing outcome may take less than a second. On the other hand, if the outcome of the gaming event is determined to be a 100 credit win (or any outcome with an award greater than five credits), the three game reels spin and may stop sequentially from left to right (or substantially simultaneously in some embodiments) over a time period substantially longer than the quick spin time for the non-preferred outcome. The total time from the player initiating the gaming event to the display of the final outcome for this 100 credit win may take two to three seconds. The increased spin time for the gaming event with the preferred outcome builds player anticipation and allows a player to enjoy the preferred result of the gaming event. At the same time, if the result of the gaming event is not a preferred outcome, the gaming event is over very quickly. In other words, very little time is spent on losing or non-preferred gaming events, while greater time and emphasis is placed on more exciting winning outcomes.

As mentioned above and discussed more fully below, some embodiments of the present concept include a gaming device that is configured to automatically initiate a subsequent gaming event after completion of a first gaming event. These gaming sessions may continue until a specific type of outcome is reached or until another session ending event occurs.

For purposes of this discussing this concept, a win-seeking feature or win-seeking gaming session automatically plays one or more gaming events until a winning outcome is reached. That is, the feature "seeks out" a win. It may occur on the first gaming event of the win-seeking gaming feature or on the five hundredth gaming event, but the gaming device will continue to automatically initiating additional gaming events until a win is reached or the credits available to wager run out. Note that a win may be defined as any outcome that has a prize associated with it, or may be defined as a win with a prize above a predetermined value. Additionally, a win may be defined as a combination of symbols that have a beneficial or preferred result for a player even if the combination by itself is not tied to a monetary award. For, example in a spinning reel game with three reels, the outcome "Any Bar" "Any Bar" "Any Bar" may not be directly tied to a monetary award, but may nevertheless be considered a win in some circumstances if it triggers a bonus event, where the player may win an award, or have other beneficial virtues that are valuable to a player. Additionally, if a mystery bonus is triggered on a gaming device, the gaming event taking place when the mystery bonus is triggered may be considered and treated as a win even though the symbol combination of the outcome may not have a corresponding monetary award.

A fast-forward feature or fast-forward gaming session, on the other hand, automatically plays one or more gaming events until a predetermined event or fast-forward stop event occurs. Fast-forward stop events may occur when the outcome of a gaming event is a winning outcome or when the outcome of the gaming event is associated with an award larger than a predetermined value (similar to the win-seeking feature). Alternatively, a fast-forward stop event may occur when a predetermined number of gaming events have been automatically played, when a predetermined amount of time has elapsed from a time when a game initiating button is activated, when a player input is received, when a wager amount is greater than the credits available to wager on the gaming device, when a bonus event is reached, or other similar events. In other words, in a fast-forward feature, the gaming device is "fast forwarding" through gaming events to reach a predetermined stopping point. Although some of the embodiments refer to a win-seeking feature or gaming session and other embodiments refer to a fast-forward feature or gaming session, these features or gaming sessions are interchangeable within these embodiments.

Figure 4A:
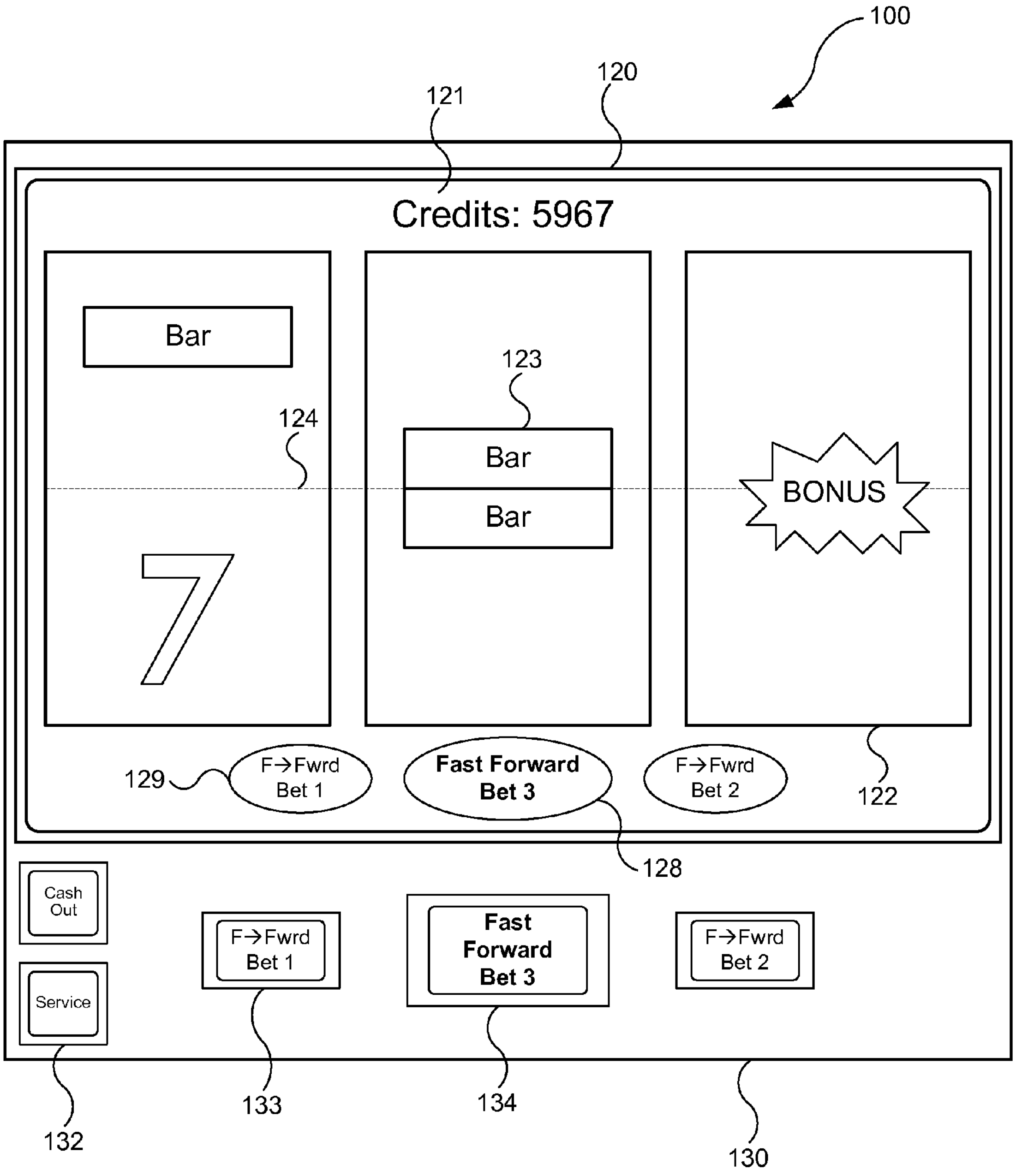
FIGS. 4A and 4B are detail diagrams of a gaming device according to embodiments of the invention.
Figure 4B:
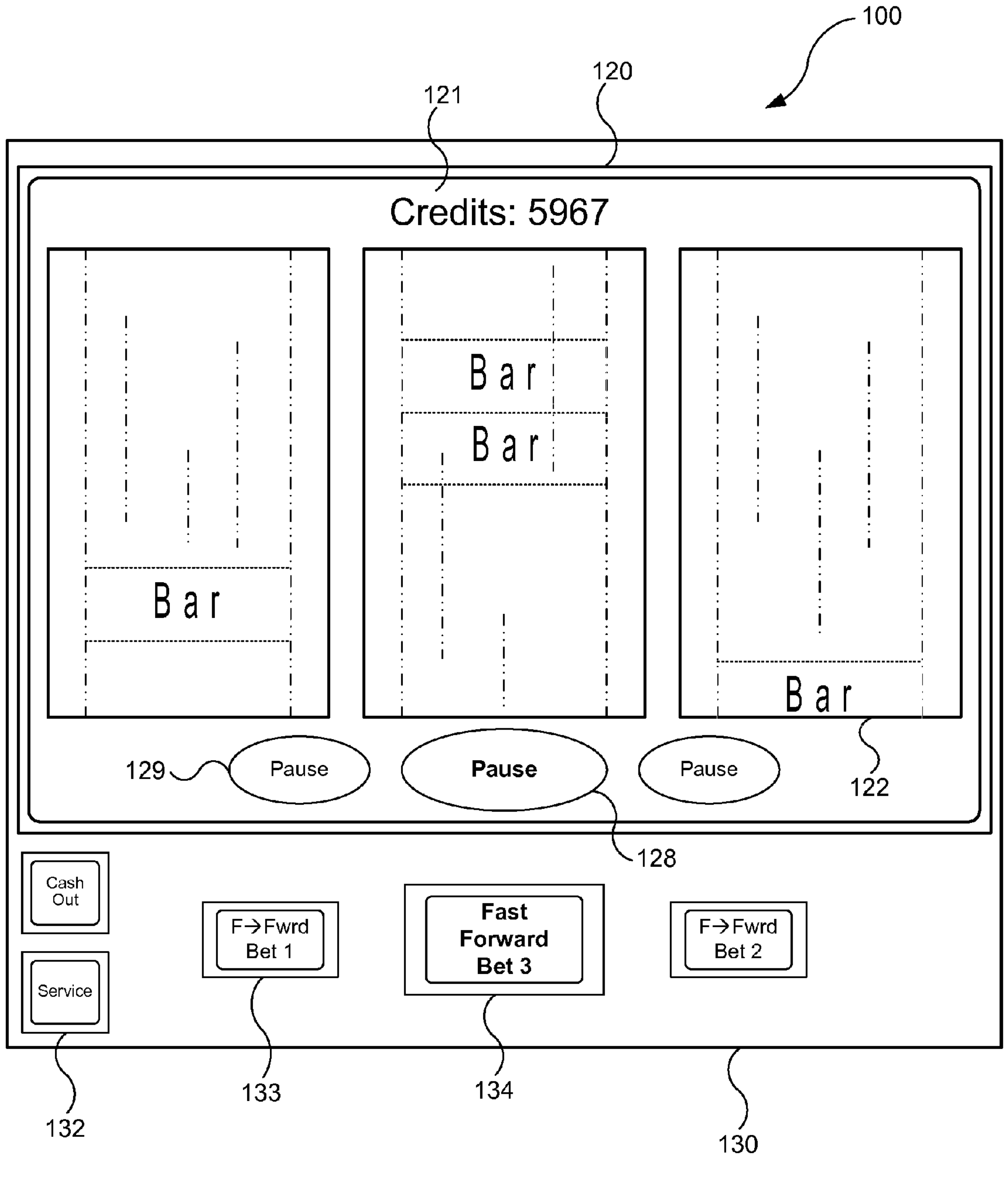

FIGS. 4A and 4B are detail diagrams of a gaming device according to embodiments of the invention. FIG. 4A illustrates a gaming device 100 before a gaming session or after a gaming session, while FIG. 4B illustrates a gaming device 100 during a gaming event in a gaming session.

Referring to FIGS. 4A and 4B, a gaming device 100 includes a gaming display 120 and a player interface panel 130. The gaming display 120 may include physical reels (such as illustrated in FIG. 2A) or, as illustrated in this embodiment, may include a plurality of video reels 122 as part of a video display. Each of the plurality of reels may include symbols 123 such as a "Bar" symbol or a blank symbol. One or more paylines 124 may also be indicated on the gaming display 120. A credit meter 121 may be part of the gaming display 120 as illustrated in this embodiment, but may also be represented by a separate meter. One or more soft buttons 128, 129 may also be present on the gaming display as previously described. The player interface panel 130 may include a plurality of game buttons 132 and one or more game initiating buttons 133, 134. The soft buttons 128, 129 shown on the game display 120 may correspond to the game initiating buttons 133, 134 on the player interface panel 130.

In the embodiment shown in FIGS. 4A and 4B, the gaming device 100 is configured to vary the game speed of the gaming device 100 to minimize time spent on losing outcomes. For example, the gaming device 100 illustrated in the present embodiment is a three reel 122 video slot machine with three game initiating buttons: two fast forward game initiating buttons 133 that respectively place wagers of one and two credits, and fast forward max bet game initiating button 134 that places a wager of three credits and may make the player eligible for a receiving a bonus on a bonus device such as a Spin Star bonus wheel. If each credit wagered on this machine is $1 (just an example, other amounts are equally useful) than the fast forward game initiating buttons 133, 134 would place a wager of $1, $2, or $3 depending on which of the game initiating buttons 133, 134 is activated by a player. After the player inserts money, e.g., $20, and presses one of the game initiating buttons 133,134 (or soft buttons 128, 129), the game reels 122 spin, but as soon as one game is finished and determined not to be a win, the next game begins. In this embodiment, the player may press any one of the game initiating buttons 133, 134 (or soft buttons 128, 129 as illustrated in FIG. 4B) at any point to stop the reels. Note that in FIG. 4B, the game reels 122 are illustrated in spinning motion and the labels of the soft buttons 128, 129 have been changed to read "Pause" to emphasize to a player that any of those buttons 128, 129 may be pressed to pause the gaming session. In embodiments, where the label of the physical game initiating buttons 133, 134 can be dynamically altered, these labels may also be changed to read "Pause" or "Stop".

After one of the game initiating buttons 133, 134 has been activated, the gaming device 100 initiates a gaming session that includes one or more gaming events. Typically, a Random Number Generator (RNG) (included, for example, in the game processor 40 (FIG. 1)) determines an outcome based on the exact time that a game initiating event occurs.

With the present concept, the RNG may determine an outcome only as needed during a gaming session. That is, a new random number may be selected upon the indication that a new game outcome is needed. Here, any routine or rhythm in making an RNG selection will be varied at least during wins, which will have unpredictable game delays associated with rolling up the credits or pausing for player input. In other embodiments, a list of RNG values may be selected immediately when the gaming session is initiated and each RNG outcome on the list or every $n^{th}$ outcome on the list may be used to determine a subsequent gaming event outcome. The list may be replaced any time the player reinitiates a gaming session with a new list of RNG outcomes.

When the RNG determines a losing outcome, the reels barely spin and pause on the losing outcome instead of coming to a complete stop. In this game, a loss takes only a very brief time to complete (such as a ¼ second) and the next game is underway. In some embodiments, winning events are displayed with a full stop of the reels, while credits are awarded and rolled up before the gaming session is continued. This pause is allotted to allow players time to appreciate the win they accomplished and the pause duration may be proportional in size to the size of the win (a 2 credit win barely pauses while a 500 credit win pauses for a number of seconds). The spin time for wins is far shorter than in traditional games—say ½ second as compared to 2 or 3 seconds. As already explained, losses occur far more rapidly, taking only ¼ second to accomplish. The overall pause time after a win averages out to about 2 seconds and the time required for a player to initiate the next game is eliminated (though a player can inject a pause at any time simply by pressing one of the game initiating buttons 133, 134). Table 1 provides an example of these times. Note that Reel Spin Time is labeled as "RST" and is the time provided for the completion of the initiation and spinning of the reels. Outcome Display Time is labeled as "ODT" and is the time provided within a gaming event to display each of the reels and the final outcome. Delay Time is the time allocated after the gaming event before a subsequent gaming event is ready to play (i.e., activating the gaming buttons and preparing to accept a wager). The Total Time is the sum or total of these listed times for wins (W) and Losses (L).

TABLE 1

| | Losing RST | Winning RST | Losing ODT | Winning ODT | Delay Time | Total Time |
|---|---|---|---|---|---|---|
| Conventional Game | 2.5 sec | 2.5 sec | 3.0 sec | 3.0 sec | 0.5 sec | W: 6.0 sec L: 6.0 sec |
| Fast-Forward Game | 0.10 sec | 0.50 sec | 0.15 sec | 2.0 sec | 0.0 sec | W: 2.5 sec L: 0.25 sec |

In the new game, wins consume just 2.5 seconds and losses require only 0.25 seconds. Presuming 60% of game outcomes are losses; average time per outcome is only about 1.15 seconds-roughly 5 times faster than a traditional game. The Delay Time for the Fast-Forward Game can also be kept to minimum because the game does not need to pause to reactivate all of the game buttons and prepare to accept another wager. Rather, since the next gaming event automatically takes place after completion of the previous gaming event, this time can be reduced or eliminated. Even in embodiments that wait for player input after a winning outcome, this time can be reduced or eliminated because the game buttons do not have to be deactivated during game play and hence reactivated after game play (conventional games often include this to limit the ability of players to "slam" through games by repeatedly pressing the game buttons).

Players spend their experience on winning events much more using this scheme, but of course, they are wagering on a lot more games and hourly costs can skyrocket. The cost of playing a game is generally calculable as an hourly cost by multiplying wager size*game speed*hold percentage. For a conventional game, a player playing $3.00 per gaming event at an approximate speed of one game event every six seconds with an average payback percentage of 92.5% would have an hourly cost of $3.00 (wager size)*600 (games per hour)*0.075 (1−payback percentage)=$135 per hour. Using the previous formula, a game using the present concept would cost $3.00*3130 (games per hour using 1.15 seconds per game)*0.075%=$704/hour: Great for casinos, but too expensive for most players. To lower that cost, the average wager size and/or the hold percentage can be reduced. If hold percentage is dropped to 1.4% (a payback percentage of 98.6%), the cost/hour becomes $3.00*0.014*3130=$131.46/hour, which is pretty close to the same hourly cost as a standard 92.5% game.

Presume both old and new games have exactly the same paytable and volatility where 40% of outcomes are wins. Remember too, each has the same hourly cost of play (i.e., profit to casino). Let's look at the player's experience reflected in Table 2:

TABLE 2

| Original Game | | "No Loss" Game | |
|---|---|---|---|
| Total Games | Total Wins | Total Games | Total Wins |
| 600 | 240 | 3,130 | 1,252 |

Under this new technique, for about a $130 cost, players enjoy an hour of gambling loaded with over 1,200 wins—about 1 win every 2.875 seconds. The old game gives a win every 15 seconds. Under the new methodology, players activate the fast-forward gaming session and watch the wins roll in until they elect to stop the game. In the conventional system, a player must press a game initiating button or pull a game initiating handle 600 times every hour.

In embodiments where the gaming session ends after a win is reached, the numbers may be changed a little bit to reflect the time it takes a player to reinitiate a gaming session. However, many players do not reflect on small wins long. Hence, these players often quickly reinitiate games even when a winning outcome is displayed. Some players even "slam" through the credit roll-up to rush to the next gaming event. Thus, while the payback percentage may have to be lowered slightly to accommodate for the slight reduction is speed, the payback percentage may still be kept significantly higher than for conventional gaming devices while maintaining a consistent cost per hour.

In some embodiments, the gaming device 100 may display a different losing outcome than the one determined by the game processor 40 (FIG. 1A) to maintain the increase in game speed. This may be especially important in embodiments that utilize physical spinning reels as a gaming display 120 rather than video spinning reels. To the player, a loss is a loss no matter what kind of loss is displayed on the gaming display 120. In addition, past problems of repeatedly showing a "near-miss" of a jackpot is eliminated because all reels can stop together, and the losing outcome is only displayed momentarily. In addition, physical spinning reel embodiments of the gaming device 100 will show the closest reasonable loss to a present position of the spinning reels to improve the game speed rather than attempting to show multiple jackpot symbols with one reel nearly missing the last-needed jackpot symbol.

To discourage players from continually pausing or stopping gaming sessions (and hence negating the benefit of the faster game play while still taking advantage of the higher payback percentage), some embodiments may use a plurality of paytables in calculating the outcomes for gaming events. For example, a higher payback paytable may be used after three consecutive gaming events have occurred without the player actively pausing or stopping the gaming session. A lower payback paytable may be used for up to three gaming events after a player actively pauses or stops the gaming session.

In other embodiments, a more positive (and intuitively understandable) motivation may be provided to discourage players from actively pausing or stopping gaming sessions. For example, a top jackpot may only be available after a consecutive number of gaming events are played without an active pause or stop. In other embodiments, the top jackpot may only be available during an automatically initiated gaming session. Alternatively, a top award may be decreased each time the player actively pauses or stops a gaming session.

In yet other embodiments, each gaming session may include a set amount of time that may be used for pauses. If, for example, a player is given 60 seconds of pause time for each gaming session, the player may not be able to pause a gaming session after the 60 seconds has been used up. In this case, the player may have to press the cash-out button 132 to stop a gaming session.

In some embodiments, a string of consecutive losses may pay an award to the player. That is, even though losses are sped through using embodiments of the present concept, a string of consecutive losses in which the player's credit meter continues to dwindle may prove equally frustrating. Thus, giving a player a small award for consecutive losses may boost their morale while not costing much in return. In other embodiments, the size of the "loss prize" may be tied to the number of consecutive losses. For example, a string of ten consecutive losses may pay only 5 credits, but fifteen straight losses pays 20 credits and twenty consecutive losses may pay 100 credits. Because it is unlikely that a player will go for extended periods without reaching a win, these significantly sized "loss prizes" may not occur very often. In still other embodiments, the player may be given a choice of foregoing one or more wins to attempt to get a better "loss prize." In the above example, if the player won a 5 credit win on the 18$^{th}$ consecutive loss, the player may choose to forgo this win of 5 credits to see if he or she could lose two more games and obtain the "loss prize" of 100 credits.

Additional player feedback related to the outcome of gaming events may also be included in some embodiments. In some of these embodiments, an anticipatory sound or auditory signal may be played during the reel spins of winning outcomes. Thus, player anticipation may build when the player hears the sound during a reel spin, since the player associates that sound with a winning outcome. Different sounds may also be played for different levels of win amounts. For example, different sounds may be played for respective win levels of: 10 credits or less, 11 to 20 credits, 21 to 50 credits, 51 to 100 credits, 101 to 500 credits, and 501 credits or more. In other embodiments, the anticipatory sound may only be played for wins above a predetermined amount or otherwise defined as a preferred outcome (such as for a bonus). These sounds may be played through the speaker or speakers 26 (FIG. 1A) of the gaming device 100.

In other embodiments, losing sounds may be played during losing game outcomes.

Since, the reel spin time for losing outcomes is shorter than the reel spin time for winning outcomes, the sound for the losing outcomes may be limited to a single note or tone, or limited to only a few notes or tones. Additionally, during a streak of losses, the losing sound may change or escalate in pitch, volume, tone, or other means to reflect the continued losses. This change in the losing sound may occur on each successive loss or after "n" losses. For example, the losing sound may be a simple low note for the first three losses, increase in pitch for the next three losses, increase in pitch and volume for the next three losses, increase again in pitch for the next five losses, etc.

In addition to auditory feedback for players, visual or "touch" feedback may also be employed in some embodiments of the gaming device 100. Within the game play itself, the longer reel spins of a winning outcome is a visual cue provided to the player to build anticipation. However, other visual cues may be used to indicate winning or preferred outcomes. For example, additional lights on the gaming display 120 or gaming cabinet 15 (FIG. 1B) may be illuminated or change colors during preferred outcomes. Other examples may include using light patterns, such as flashing the lights, or the use of graphic or video displays on the gaming display 120 or other portion of the gaming device 100. "Touch" feedback may also be included in some embodiments to emphasize winning or preferred outcomes. For example, one or more game buttons 132 or game initiation buttons 133, 134 may vibrate. In other embodiments, a gaming handle 12 (FIG. 1A) or chair connected to the gaming device may incorporate movement, such as a vibration, to indicate a preferred outcome. Visual and "touch" feedback may also be used in some embodiments with losing outcomes, or strings of losing outcomes.

Figure 5:
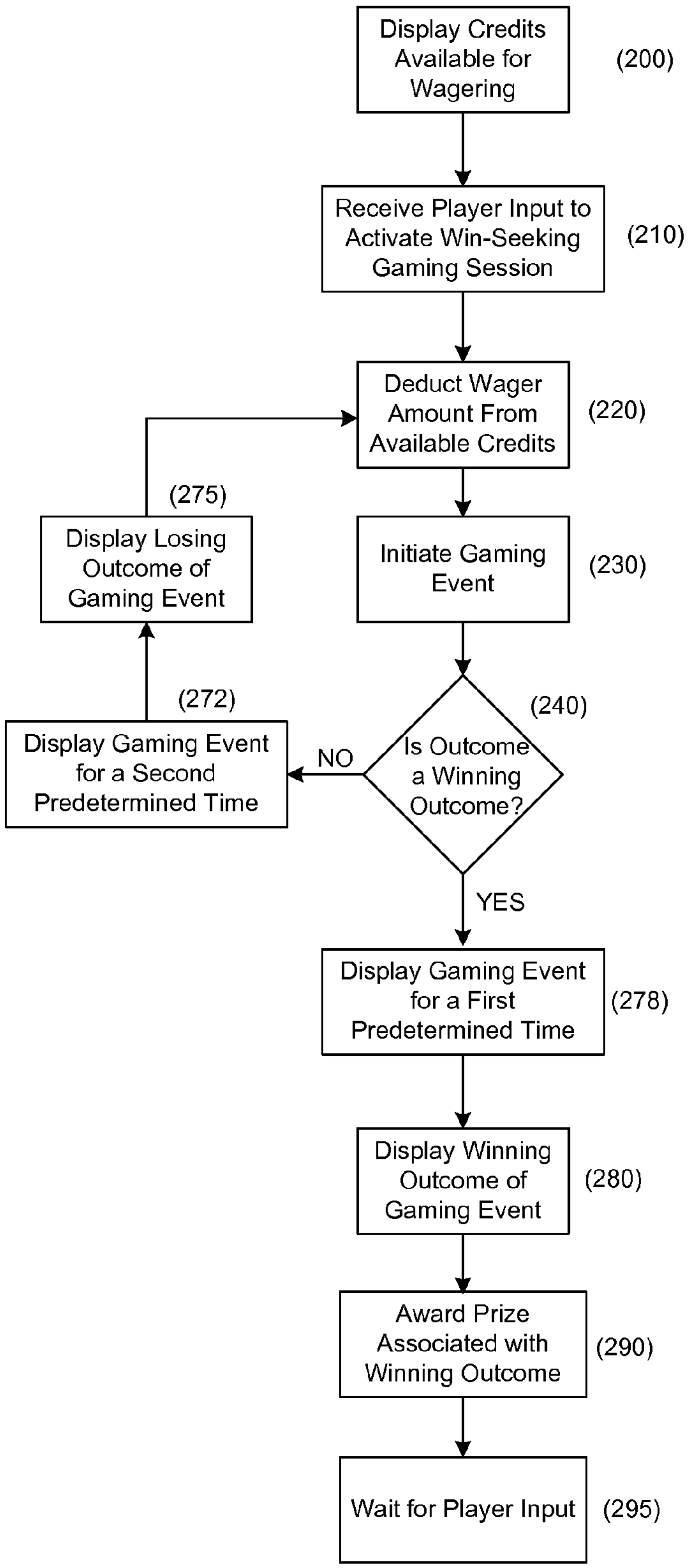
FIGS. 5, 6, and 7 are flow diagrams of exemplary methods of operating a gaming device according to embodiments of the invention.
Figure 6:
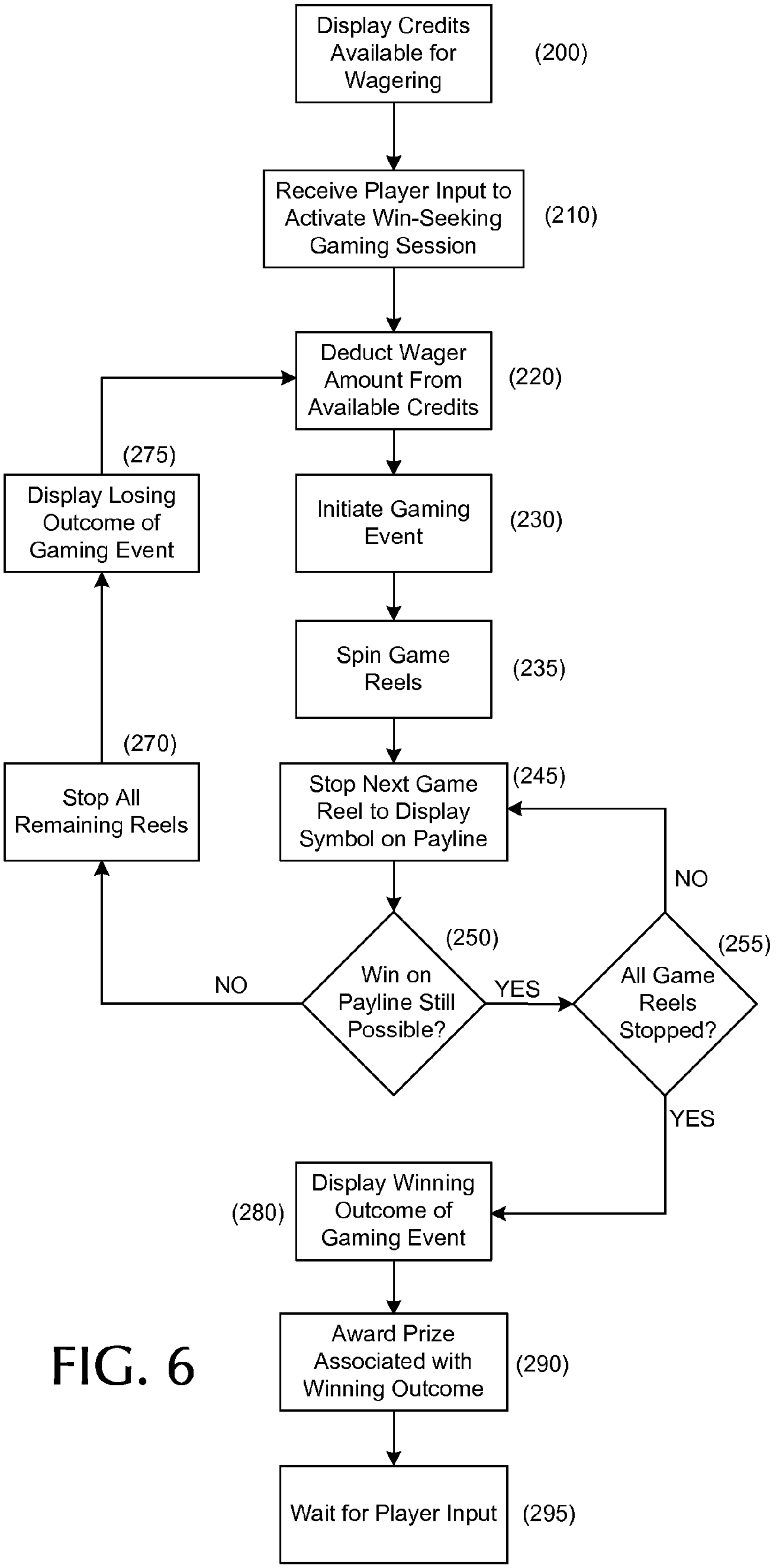
Figure 7:
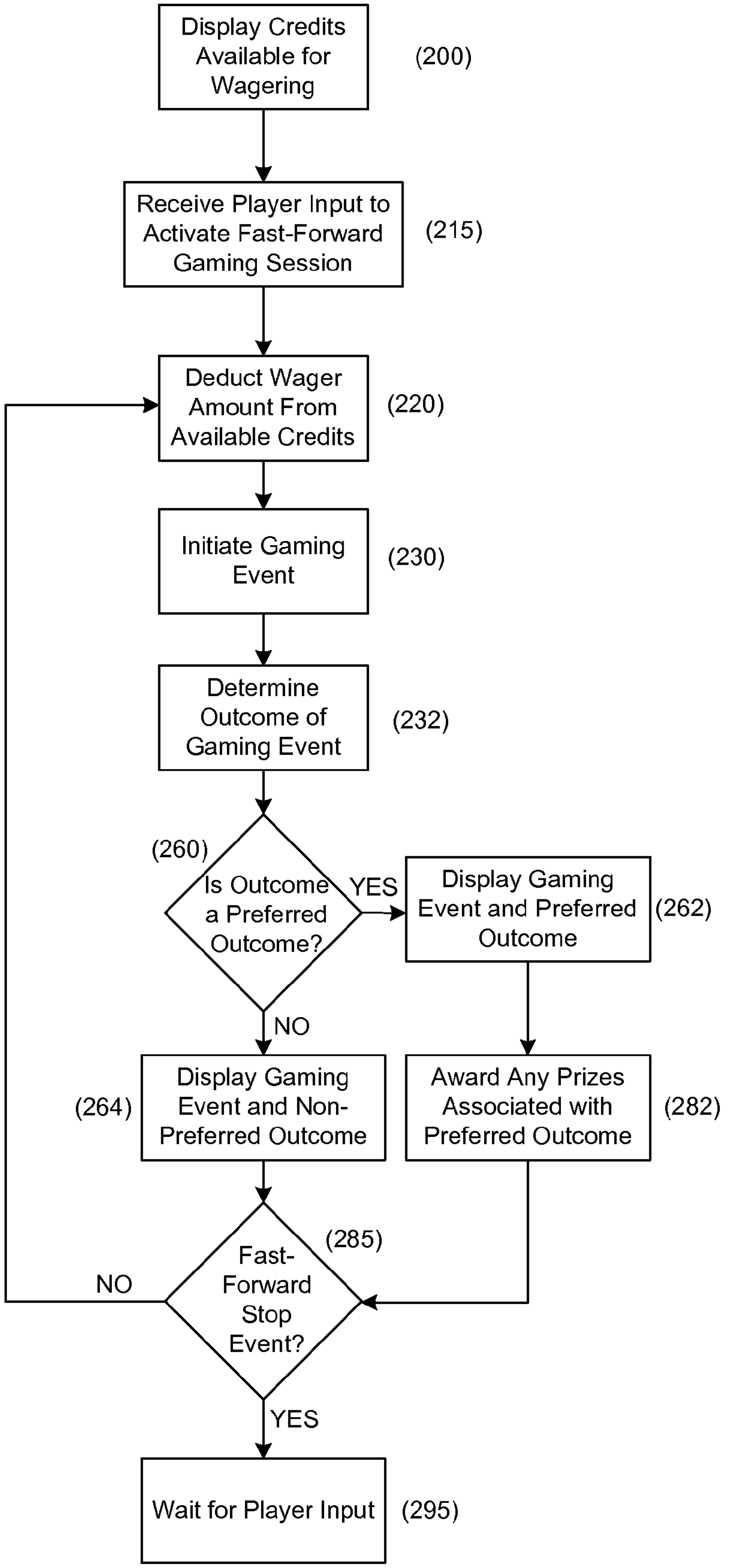

FIGS. 5, 6, and 7 are flow diagrams of exemplary methods of operating a gaming device according to embodiments of the invention.

Figure 9:
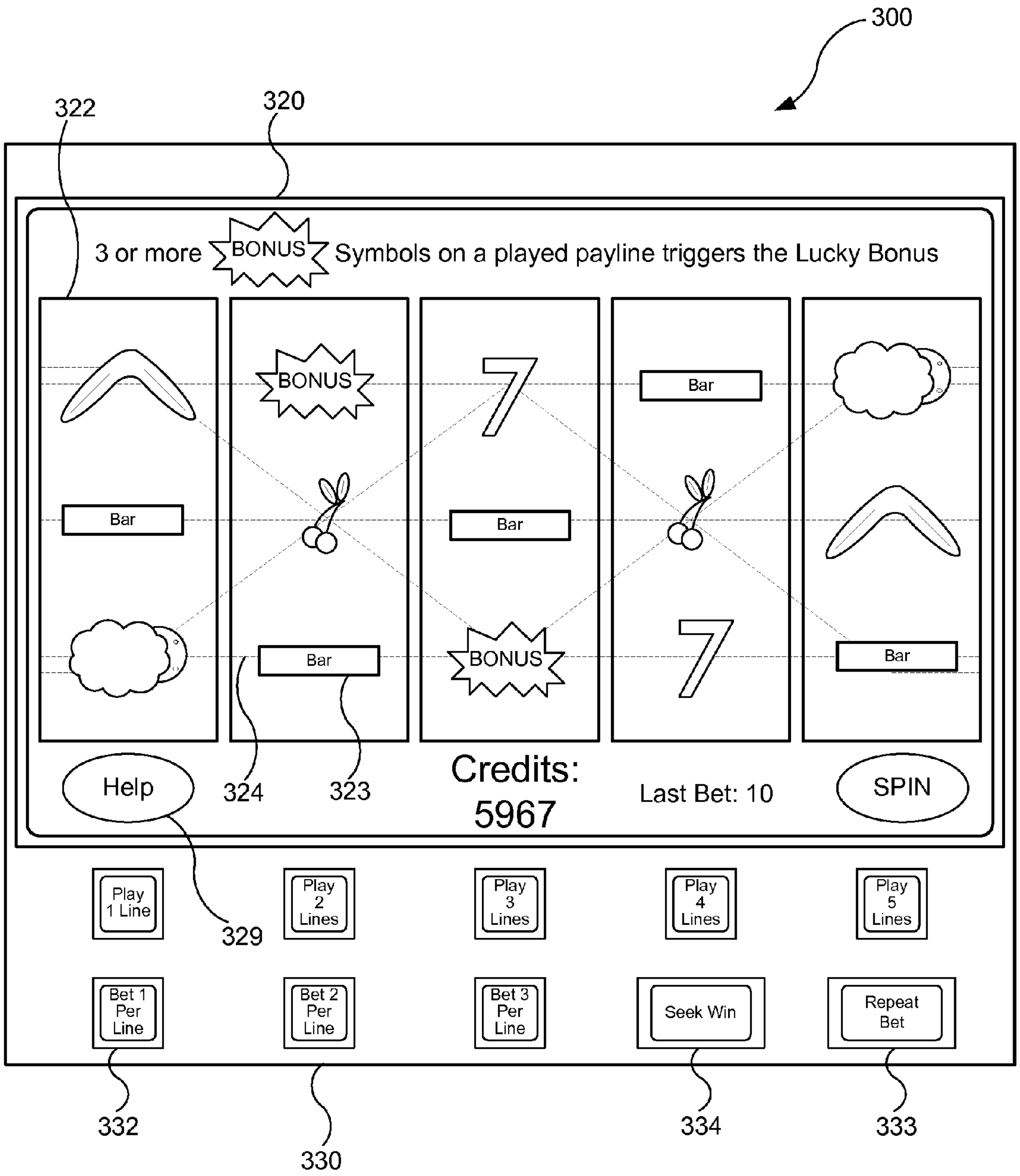
FIG. 9 is a detail diagram of a gaming device according to embodiments of the invention.

Referring to FIG. 5, an exemplary method of operating a gaming device with a win-seeking feature is described. After a player enters credits into a gaming device 100 (FIG. 4A), the credits available for wagering by the player are displayed on a credit meter (200). The gaming device 100 waits until it receives a player input to activate a win-seeking gaming session (210). When the win-seeking gaming session is activated, the gaming device 100 deducts an amount wagered by the player from the credits available for wagering (220) and initiates a gaming event (230). The amount wagered by a player may be determined by which one of the game initiating buttons 133, 134 (FIG. 4A) is pressed, or may be determined by one or more wager parameters set up by a player on a gaming device with multiple bet options (such as shown in FIG. 9).

After the gaming event has been initiated, the gaming device 100 may ascertain an outcome associated with the gaming event and determine if the outcome is a winning outcome (240). In some embodiments, any outcome that results in credits returned to a player may be considered a winning outcome. This is especially the case in single line games utilizing three spinning reels. In other embodiments, only outcomes that result in a win larger than an amount wagered or larger than a predetermined amount may be considered a winning outcome. These embodiments may be more useful in multi-line games with five reels.

If the outcome is not determined to be a winning outcome, the gaming event may be displayed for a second predetermined time (272) and the losing outcome may be briefly displayed (275) before another wager amount is deducted from the available credits (220) and another gaming event is initiated (230). In spinning reel games, all of the spinning reels may be stopped substantially simultaneously to increase the game speed. However, in other embodiments, the reels may be stopped very quickly from left to right. In either embodiment, the time spent spinning of the reels themselves may be kept to a relatively short amount of time so as to increase the overall game speed and quickly reach the next gaming event. As mentioned above, it is typically preferable to immediately go into the next gaming event after the losing game outcome is displayed. However, in some embodiments, a small delay time may be utilized after the losing outcome is displayed to increase the time the player has to pause the gaming session, change a wager amount, or observe the displayed losing outcome.

If the outcome is determined to be a winning outcome, the gaming event may be displayed for a first predetermined time (278) and the winning outcome of the gaming event is displayed (280). When a winning outcome is to be displayed, the gaming device 100 may spin the reels for a longer period of time than when a losing outcome is displayed so that the player knows a win is about to happen. Additional auditory or visual clues may also be used to indicate that a win is about to occur to increase player anticipation. Further, if a winning outcome is to be displayed, the reels may stop one by one from left to right rather than all stopping substantially simultaneously.

Any prizes associated with the winning outcome are awarded to the player (290) and the gaming session is ended. When the gaming session ends, the gaming device 100 may wait for further player input (295), which may include the initiation of another gaming session or the cashing out of any remaining credits.

Referring to FIG. 6, an exemplary method of operating a gaming device that increases player anticipation during a win-seeking feature is described. That is, in some embodiments it is preferable to maintain player anticipation in the games even if they are ultimately losses. For example, instead of the game speeding up and ending as soon as it is determined to be a losing game, some embodiments may maintain normal reel spin rates as long as it appears possible for a player to have a winning game session. The "near-miss" is often times as motivating for a player to continue play as a lower winning game. Thus, for a multi-reel game, as long as bars (7s, cherries, etc.) appear on the pay line, the game plays at a normal pace. When the first blank or non-conforming symbol appears on a reel (i.e., when it becomes apparent that the game will be a losing game), the remaining reels either speed up or come to halt pausing briefly to show the final losing outcome before re-initiating another game. This would allow the player to experience anticipation at wins (or even just large wins) while still speeding through losses.

After a player enters credits into a gaming device 100 (FIG. 4A), the credits available for wagering by the player are displayed on a credit meter (200). The gaming device 100 waits until it receives a player input to activate a win-seeking gaming session (210). When the win-seeking gaming session is activated, the gaming device 100 deducts an amount wagered by the player from the credits available for wagering (220) and initiates a gaming event (230).

After the gaming event has been initiated, the gaming device 100 may spin each of the game reels 122 (235). The gaming device may then stop the leftmost (or rightmost in other embodiments) reel (245). It is then determined whether a win on an active payline is still possible (250). For example, on a three reel game with only a single center payline (such as illustrated in FIG. 4A), if a blank lands on the payline of the first reel, there is not (in some embodiments) a possible win that the player can achieve. However, if a Bar symbol lands on the center payline, then it is still possible that a win may occur.

If it is determined that a win is not possible, all of the remaining reels are quickly stopped (270), the final losing outcome is displayed (275), and the gaming session continues by deducting another wager amount from the available credits (220). If it is determined that a win is still possible, the gaming device 100 determines if all of the game reels have stopped (255). If all of the game reels have not yet stopped, the next game reels is stopped (245) and the process is repeated. If it determined that all of the game reels are stopped (255) and that a win is possible on a payline (250), the outcome is a winning outcome. At this time, the gaming device 100 displays the winning gaming outcome (280) and awards any prizes associated with the winning outcome (290). When the gaming session ends, the gaming device 100 may wait for further player input (295), which may include the initiation of another gaming session or the cashing out of any remaining credits.

Referring to FIG. 7, an exemplary method of operating a gaming device during a fast-forward feature is described. As discussed above, for purposes of this discussion, a win-seeking feature or gaming session automatically plays one or more gaming events until a winning outcome is reached. A fast-forward feature or gaming session automatically plays one or more gaming events until a predetermined event or fast-forward stop event occurs. Fast-forward stop events may occur when the outcome of a gaming event is a winning outcome, when the outcome of the gaming event is associated with an award larger than a predetermined value, or when a preferred outcome is reached (similar to the win-seeking feature). Alternatively, a fast-forward stop event may occur when a predetermined number of gaming events have been automatically played, when a predetermined amount of time has elapsed from a time when the game initiating button is activated, when a player input is received, when a wager amount is greater than the credits available to wager on the gaming device, when a bonus event is reached, or other similar events.

For example, in some embodiments a "time out" feature may be employed, where the gaming device may prompt for player interaction (such as a hitting the win-seeking game initiating button 133, 134 again) after a predetermined number of games or time period has elapsed. In other words, a player may only be able to use the win-seeking gaming session for a set number of games (e.g., 20 or 50) or for a set time frame (e.g., five minutes) before having to reinitiate the feature. This may act as a time-shifting mechanism that spreads the wager out over a number of spins rather than putting a larger wager on a single spin. For example, instead of a player betting 10 credits per line on a five line game and getting a single spin with a 92.5% payback, a player would get 10 gaming session at one credit per line on the five line game with a 92.5% payback.

After a player enters credits into a gaming device 100 (FIG. 4A), the credits available for wagering by the player are displayed on a credit meter (200). The gaming device 100 waits until it receives a player input to activate a fast-forward gaming session (215). When the fast-forward gaming session is activated, the gaming device 100 deducts an amount wagered by the player from the credits available for wagering (220) and initiates a gaming event (230).

After the gaming event has been initiated, the gaming device 100 determines an outcome of the gaming event (232) and ascertains whether the outcome is a preferred outcome (260). In some embodiments, a preferred outcome is simply a winning outcome. In other embodiments, however, a preferred outcome may only include winning outcomes that have associated prizes that are greater than a predetermined about or bonus triggering outcomes. If it is determined that the outcome of the gaming event is a preferred outcome, the gaming event and preferred outcome are displayed (262) and any prizes associated with the preferred outcome are awarded to the player (282). If it is determined that the outcome of the gaming event is not a preferred outcome, the gaming event and non-preferred outcome are briefly displayed (264). As discussed above, the duration of the display of the gaming event and/or the outcome may be varied dependent upon whether the outcome is determined to be a preferred outcome.

After the outcome is displayed, the gaming device 100 determines if a fast-forward stop event has occurred (285). As discussed above, a fast-forward stop event may include various criteria. If it is determined that a fast-forward stop event has not occurred, the gaming device 100 may deduct another wager amount from the credits available (220) and initiate another gaming event (230). If it is determined that a fast-forward stop event has occurred, the gaming device may end the fast-forward gaming session. When the gaming session ends, the gaming device 100 may wait for further player input (295), which may include the initiation of another gaming session or the cashing out of any remaining credits. Although this embodiment shows that the determination of the occurrence of a fast-forward stop event is made after an outcome is displayed, this determination may be made prior to the display of the outcome in other embodiments.

Figure 8A:
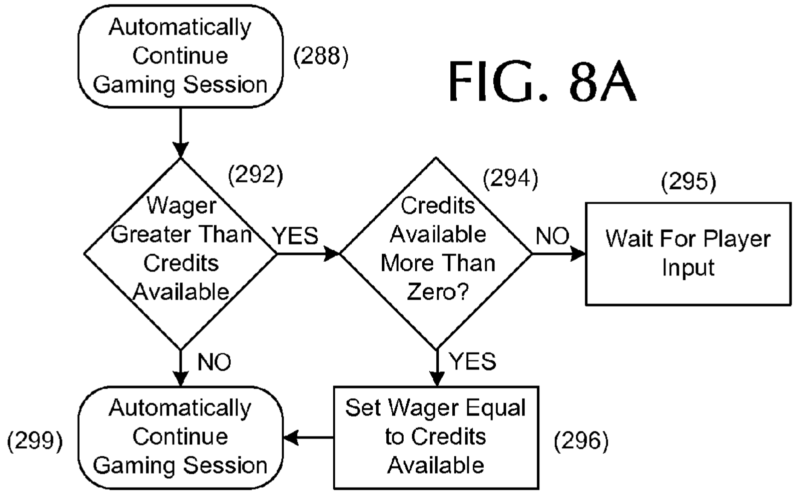
FIGS. 8A, 8B, and 8C are flow diagrams of exemplary methods of handling low credit amounts during a win-seeking feature according to embodiments of the invention.
Figure 8B:
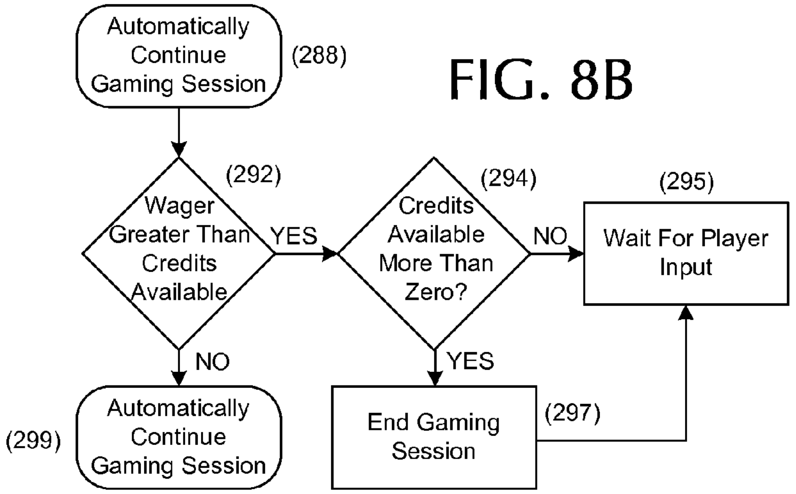
Figure 8C:
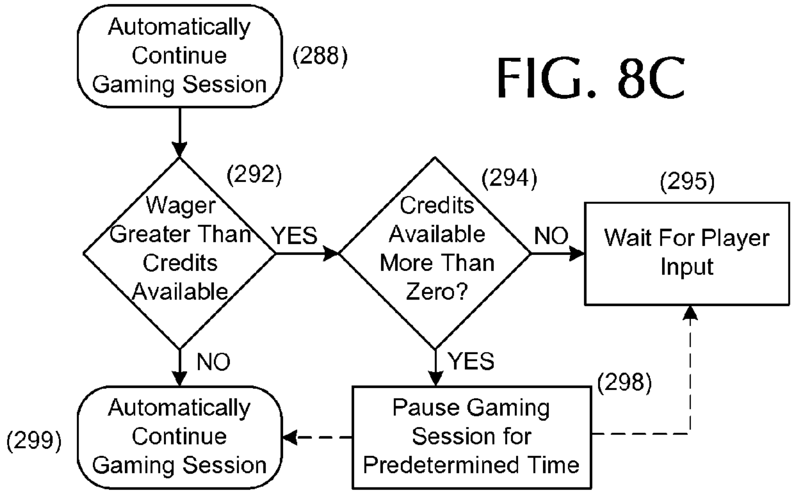

FIGS. 8A, 8B, and 8C are flow diagrams of exemplary methods of handling low credit amounts during a win-seeking feature according to embodiments of the invention. Unless a player continues inputting credits or cash-out frequently, the instance where an amount to be automatically wagered being greater than the credits remaining on the gaming device and available for wagering may not be uncommon FIGS. 8A-8C discuss several embodiments on how this situation is handled.

Referring to FIG. 8A, during an automatically continued gaming session (288) it is determined whether the wager amount that is about to be deducted from the available credits is greater than the actual amount of credits available for wagering (292). If there remain sufficient available credits to cover the automatic wager deduction, the gaming session simply continues (299). However, if the amount to be wagered and deducted is greater and the available credits, it is then determined if there are any credits available to wager (294). If there are no credits available to wager, the gaming session pauses or ends, at which time the gaming device waits for further player input (295), such as the input of additional credits. If, however, there are still credits available for wagering, but there are not enough credits to cover the amount to be automatically deducted, the wager amount may be automatically set to be equal to the amount of credits available (296) and used in the subsequent gaming event (299).

For example, if a player has been playing $3.00 per wager, but only $2.00 remain on the credit meter, the gaming device may automatically set the wager amount equal to $2.00 and initiate a subsequent gaming event.

Referring to FIG. 8B, a process using this embodiment is similar to the one described with reference to FIG. 8A. However, instead of automatically adjusting the wager amount and initiating another gaming event, the embodiment illustrated in FIG. 8B simply ends the gaming session (297) and waits for additional player input (295), such as adding additional credits or cashing out.

Referring to FIG. 8C, a process using this embodiment is similar to the ones described with reference to FIGS. 8A and 8B. However, instead of automatically adjusting the wager amount and initiating another gaming event or simply ending the gaming session, the embodiment illustrated in FIG. 8C pauses the gaming session for a predetermined time (298) to allow the player to input additional credits before either automatically adjusting the wager amount and continuing the gaming session (299) or ending the gaming session and waiting for additional player input (295). Pausing of the gaming session for a predetermined time (298) may also include notifying the player of the low credit amount by displaying a message on the gaming display 120 or by other means.

Although FIGS. 8A, 8B, and 8C provide several exemplary embodiments in handling low credit situations, other embodiments may include a gaming device that is configured to automatically withdraw credits from an online player account to replenish credits on the machine. This option may be regulated by a player having such an account at a gaming establishment. That is, a player may dictate if gaming devices are allowed to automatically replenish credits on a gaming device, and the amount of credits authorized to be replenished for each transaction and for a specified time period (e.g., a maximum amount authorized daily). These embodiments may provide a convenience to the player by not requiring them to insert additional money or retrieve additional money if they are out of cash. Additionally, automatic transfer of credits may not interrupt the player's game playing experience. This transfer of credits may be accomplished using a network 50 (FIG. 3A) connected to the gaming device, as well as a remote server 80 and database 90.

In other embodiments, the player may be notified of a low credit amount on the credit meter, and request player input to authorize a transfer of credits machine, and in some examples, an amount of credits to be transferred. In some cases, the player may be asked to provide additional information to authorize a transfer, such as entering a PIN code or providing additional identification.

FIG. 9 is a detail diagram of a gaming device according to embodiments of the invention.

Referring to FIG. 9, the gaming device 300 includes a video gaming display 320 with five video spinning reels 322. Each of the video spinning reels 322 has a plurality of gaming symbols 323. Additionally the gaming device is a multi-line game, where multiple paylines 324 exist in various configurations. The gaming display 320 also includes one or more soft buttons 329 that may be activated by player touch.

The gaming device 300 may also include a player interface panel 330 that includes a plurality of gaming buttons 332, a conventional game initiating button 333, and a win-seeking game initiating button 334. It is noted that although this embodiment describes a win-seeking feature, any of the fast-forward stop events may be interchangeable used in different embodiments.

In some embodiments, the win-seeking (fast-forward) game initiating button 334 may be optional. That is, a player may select whether to use this feature during game play. This may be from a selection in the "MENU" or "HELP" screen, or as part of their stored player preferences. Additionally, this fast-forward feature may only be available to certain players (e.g., identified players, higher wagering players, etc.).

Figure 10:
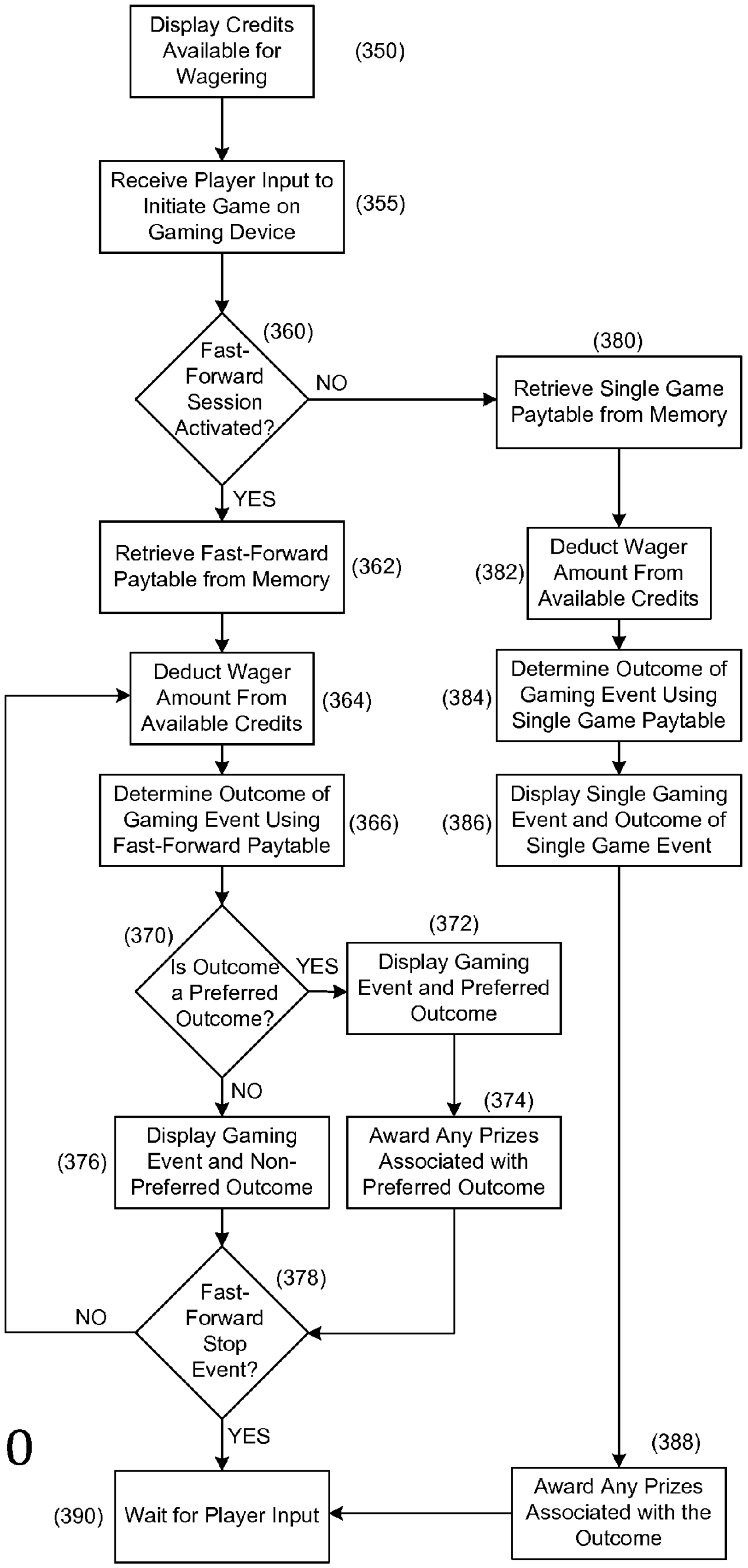
FIG. 10 is a flow diagram of a method of operating a gaming device according to embodiments of the invention.

The operation of this gaming device 300 will be discussed in further detail in conjunction with FIG. 10. FIG. 10 is a flow diagram of a method of operating a gaming device according to embodiments of the invention.

Referring to FIGS. 9 and 10, after a player enters credits into a gaming device 300, the credits available for wagering by the player are displayed on a credit meter (350). The gaming device 300 waits until it receives a player input to initiate a game on the gaming device (355). When a player input to initiate a game is received by the gaming device 300, it is determined whether a fast-forward gaming session (or win-seeking gaming session) is activated (360). If a fast-forward gaming session is not activated (i.e., a single game wagering event was initiated), the gaming device 300 retrieves a single game paytable from memory (380) and deducts a wagered amount from the available credits (382). Thereafter, an outcome for the single gaming event is determined using the single game paytable (384). The single gaming event and the determined outcome for the single gaming event are displayed (386) and any prizes associated with the outcome are awarded to the player (388). Because only a single gaming event was activated, the gaming device then waits for further player input (390).

On the other hand, when it is determined that a fast-forward gaming session was activated, the gaming device 300 retrieves a fast-forward paytable from memory (362). The fast-forward paytable may have a better payback percentage than the single game paytable since a fast-forward gaming session may be played at a much faster rate than a single game event. After retrieving the fast-forward paytable, a wager amount is deducted from the credits available for wagering (364) and an outcome of a gaming event is determined using the fast-forward paytable (366).

At this point the fast-forward gaming session may follow similar processes or steps to the fast-forward gaming sessions described with reference to FIG. 5, 6, or 7. The fast-forward gaming session processes illustrated in FIG. 10 are similar to those shown in FIG. 7. That is, after an outcome of a gaming event is determined using the fast-forward paytable, the gaming device 300 determines if the outcome is a preferred outcome (370). If it is a preferred outcome, the gaming event and the preferred outcome are displayed (372) and any prizes associated with the preferred outcome are awarded to the player (374). If the outcome is determined to be a non-preferred outcome, the gaming event and the non-preferred outcome are briefly displayed (376). As discussed above, the duration of the display of the gaming event and/or the outcome may be varied dependent upon whether the outcome is determined to be a preferred outcome.

After the outcome is displayed, the gaming device 300 determines if fast-forward stop event has occurred (378). Again these fast-forward stop events may include the occurrence of a winning outcome, a predetermined number of completed game events, an end of a predetermined amount of time, a player input, etc. If a fast-forward stop event has not occurred, the fast-forward gaming session continues by deducting another wager amount from the available credits (364) and determining another game event outcome using the fast-forward paytable (366). If, on the other hand, a fast-forward stop event has taken place, the fast-forward gaming session ends and the gaming device 300 waits for a player input (390).

Figure 11:
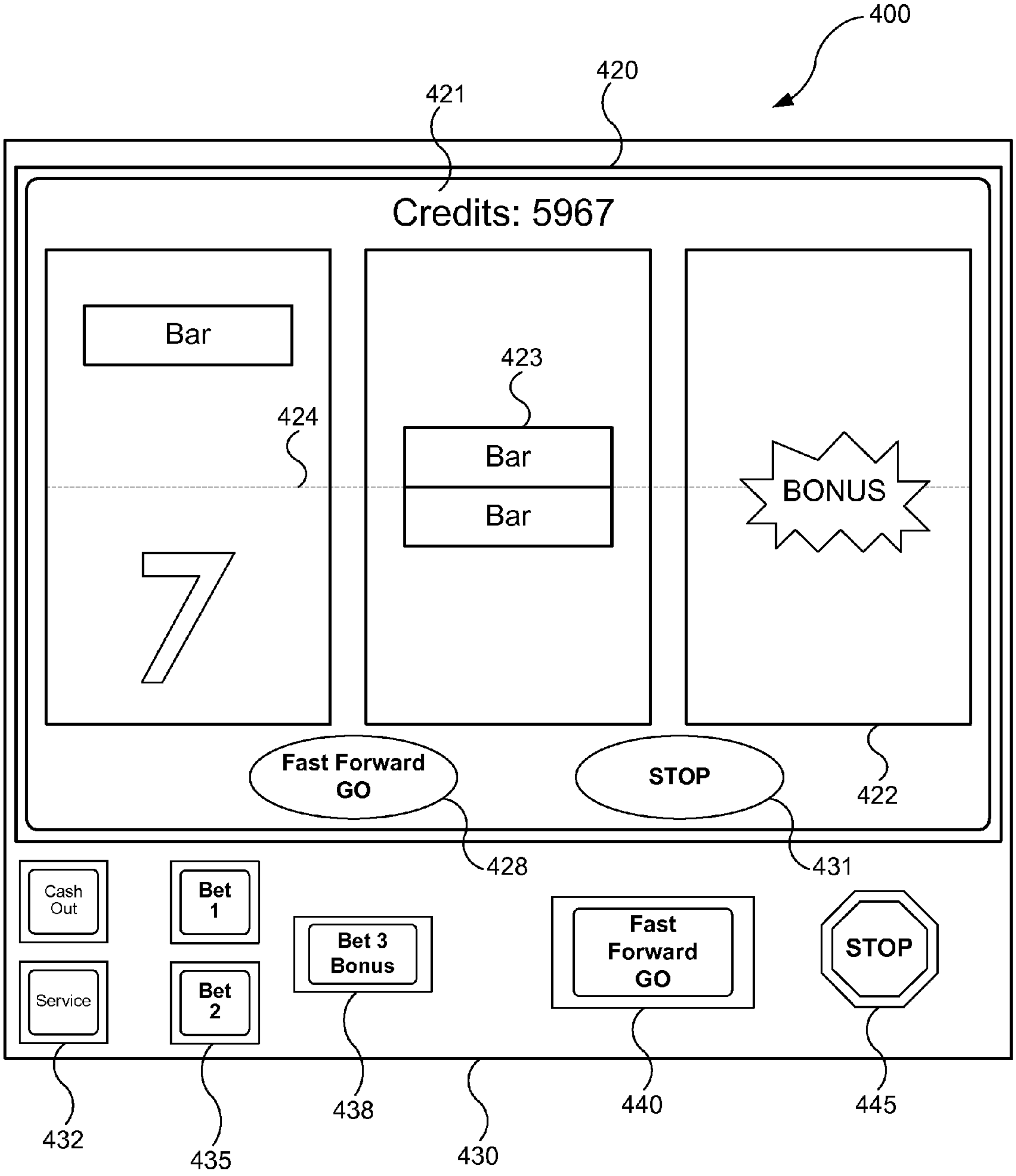
FIG. 11 is a detail diagram of a gaming device according to embodiments of the invention.

FIG. 11 is a detail diagram of a gaming device according to embodiments of the invention.

Referring to FIG. 11, the gaming device 400 includes some similar features to the gaming device 100 illustrated in FIGS. 4A-4B. That is, the gaming device 400 includes a gaming display 420 showing three video reels 422, each with a plurality of game symbols 423, a credit meter 421, and a single center payline 424. The player interface panel 430 of the gaming device 400 again includes a plurality of game buttons 432.

In this embodiment, however, the player interface panel includes a plurality of wager amount buttons 435, 438 and game controlling buttons 440, 445. The wager amount buttons 435, 438 include two lower wager amount buttons 435 and a max bet wager button 438 that may make the player eligible for a bonus prize. The wager amount buttons 435, 438 may simply allow a player to select the amount of his or her subsequent wager, may select a wager amount and initiate a fast-forward gaming session using the selected amount as the wager amount for each gaming event in the fast-forward gaming session, or may select a wager amount and initiate a single gaming event.

The game controlling buttons 440, 445 may include a fast-forward game initiating button 440 and a fast-forward stop button 445. The gaming display may also have soft buttons 428, 431 corresponding to these game controlling buttons 440, 445. The fast-forward game initiating button may be used with the wager amount buttons 435, 438 to initiate a fast-forward gaming session. The fast-forward stop button 445 may be used at any time during a fast-forward gaming session to pause or end the gaming session.

Figure 12:
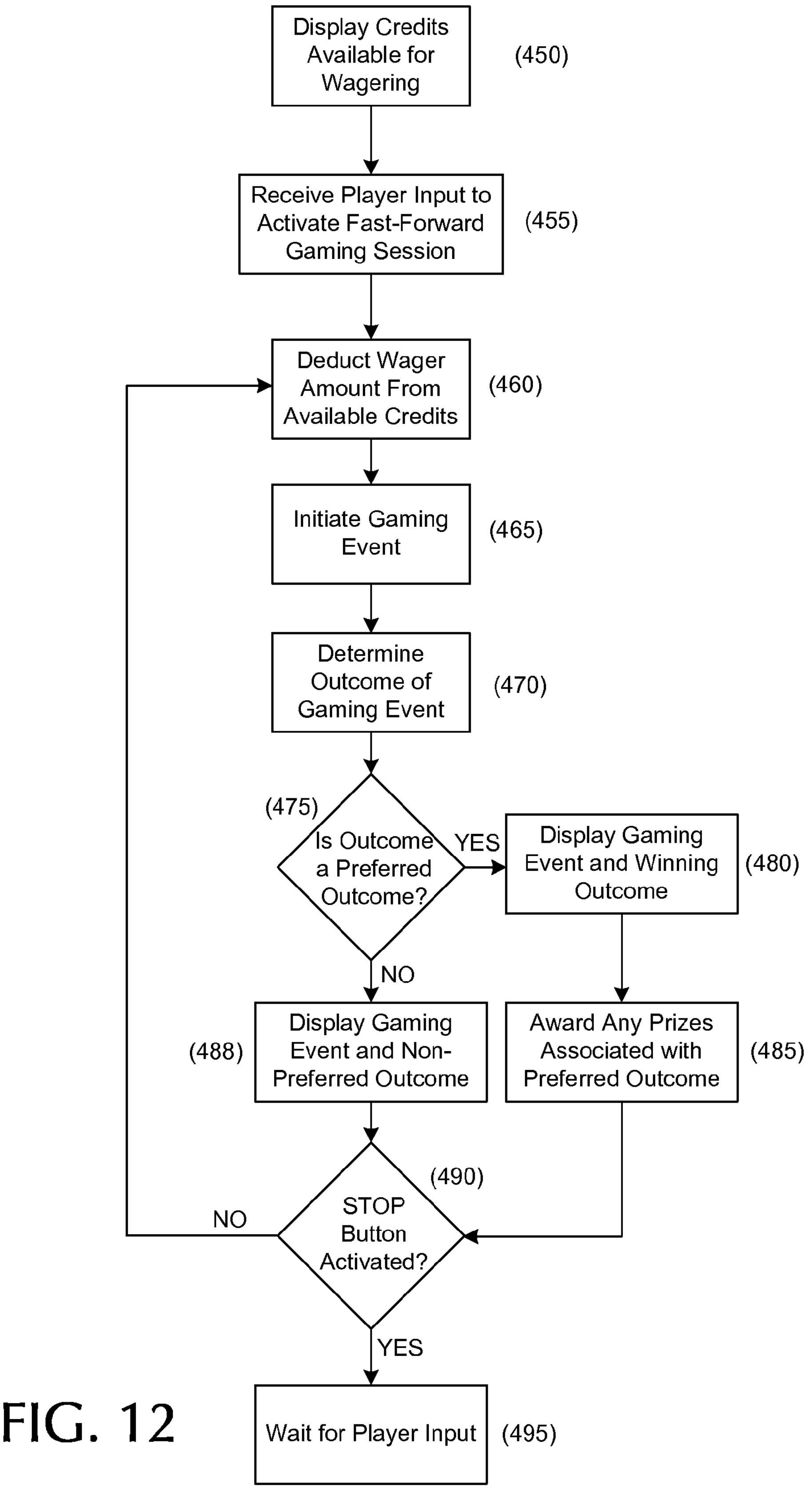
FIG. 12 is a flow diagram of a method of operating a gaming device according to embodiments of the invention.

FIG. 12 is a flow diagram of a method of operating a gaming device according to embodiments of the invention. The method of operating a gaming device illustrated in FIG. 12 is similar to the method shown in FIG. 7 except that the determination of whether a fast-forward stop event had occurred is replaced by the determination of whether the fast-forward stop button had been activated. Because of the separated buttons to activate and end a gaming session, embodiments such as those shown in FIGS. 11 and 12 may be especially well suited to instances where a gaming session automatically initiates subsequent gaming events after both winning outcomes and losing outcomes. Here, the gaming device 400 pauses longer at winning outcomes to roll-up the credits won and to allow the player to appreciate the win before automatically initiating another gaming event.

Referring to FIGS. 11 and 12, after a player enters credits into a gaming device 400, the credits available for wagering by the player are displayed on a credit meter (450). The gaming device 400 waits until it receives a player input to activate a fast-forward gaming session (455). When the fast-forward gaming session is activated, the gaming device 400 deducts an amount wagered by the player from the credits available for wagering (460) and initiates a gaming event (465).

After the gaming event has been initiated, the gaming device 400 determines an outcome of the gaming event (470) and ascertains whether the outcome is a preferred outcome (475). In some embodiments, a preferred outcome is simply a winning outcome. In other embodiments, however, a preferred outcome may only include winning outcomes that have associated prizes that are greater than a predetermined about or bonus triggering outcomes. If it is determined that the outcome of the gaming event is a preferred outcome, the gaming event and the preferred outcome are displayed (480) and any prizes associated with the preferred outcome are awarded to the player (485). If it is determined that the outcome of the gaming event is not a preferred outcome, the gaming event and the non-preferred outcome are briefly displayed (488). As discussed above, the duration of the display of the gaming event and/or the outcome may be varied dependent upon whether the outcome is determined to be a preferred outcome.

After the outcome is displayed, the gaming device 400 determines if a fast-forward stop event has occurred (490). As discussed above, a fast-forward stop event may include various criteria. If it is determined that a fast-forward stop event has not occurred, the gaming device 400 may deduct another wager amount from the credits available (460) and initiate another gaming event (465). If it is determined that a fast-forward stop event has occurred, the gaming device may end the fast-forward gaming session. When the gaming session ends, the gaming device 400 may wait for further player input (495), which may include the initiation of another gaming session or the cashing out of any remaining credits.

Figure 13:
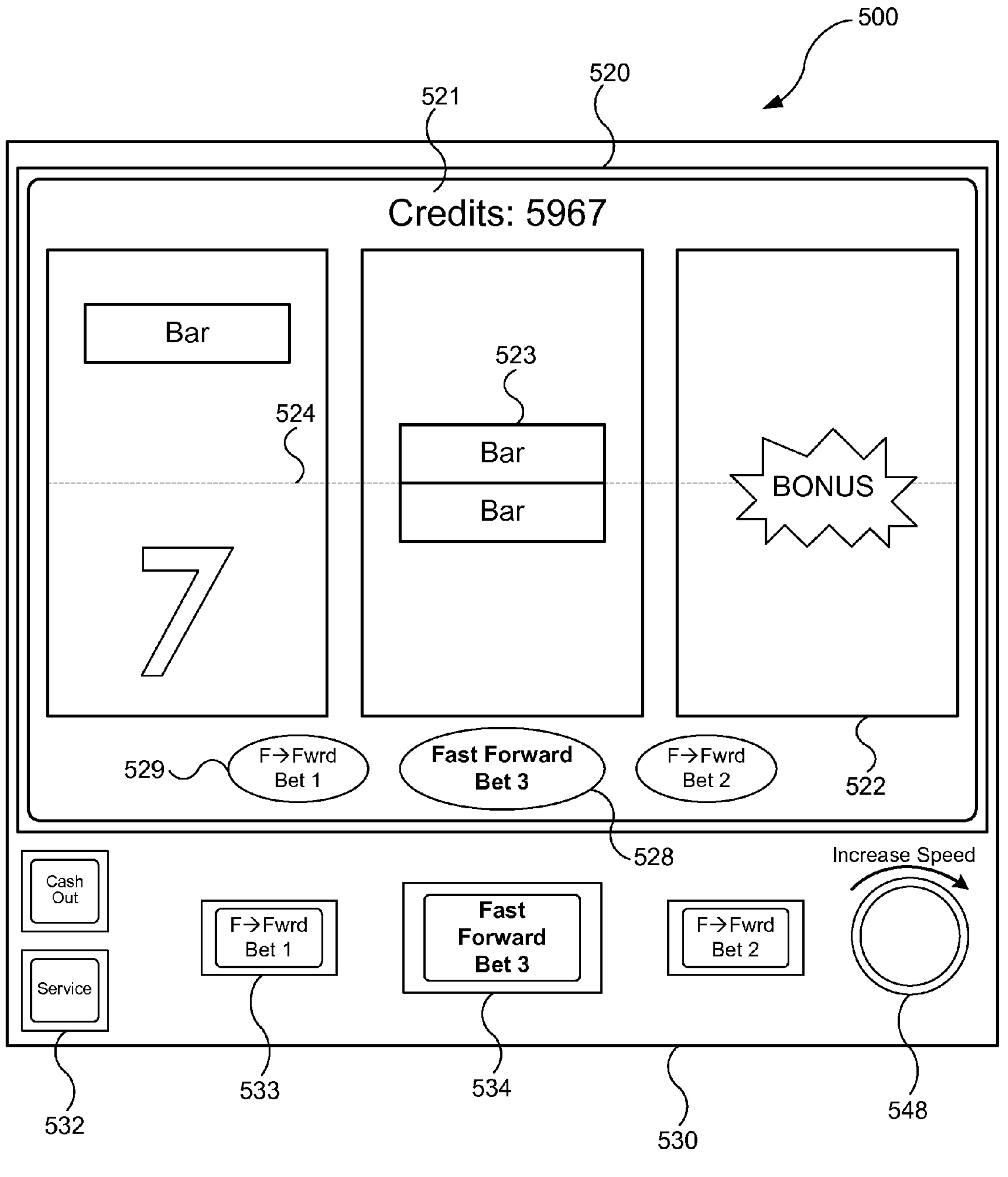
FIG. 13 is a detail diagram of a gaming device according to embodiments of the invention.

FIG. 13 is a detail diagram of a gaming device according to embodiments of the invention.

Referring to FIG. 13, the gaming device 500 includes some similar features to the gaming device 500 illustrated in FIGS. 4A-4B. That is, the gaming device 500 includes a gaming display 520 showing three video reels 522, each with a plurality of game symbols 523, a credit meter 521, and a single center payline 524. The player interface panel 530 of the gaming device 500 again includes a plurality of game buttons 532 along with a plurality of fast-forward game initiating buttons 533, 534. The gaming display 520 may also include a plurality of soft buttons 528, 529 that correspond to the fast-forward game initiating buttons 533, 534.

In addition, the player interface panel 530 includes a speed controlling knob 548. In some embodiments, the speed controlling knob 548 may be operated by the player to control the speed at which game events play at during a fast-forward gaming session. That is, the player may rotate the speed controlling knob 548 clockwise or counter clockwise to reduce the time spent spinning reels and/or displaying a gaming event outcome. In other embodiments, the speed controlling knob 548 may be used to increase or decrease the threshold for win size that pauses or ends a fast-forward gaming session. For example, a player may turn the speed controlling knob 548 clockwise to increase the threshold for win size from 2 credits to 5 credits. Thus, in this example, wins of four credits or less would be treated similarly to losses in that the gaming device 500 would only briefly pause to show the win before automatically initiating another gaming event. When the win threshold is increased, the overall game speed also increases since the gaming device 500 will not pause long for smaller wins.

The speed controlling knob 548 may be moved between discrete positions (i.e., clicked between a plurality of positions) or may be moved along a continuous analog path. Although a rotating knob is shown as the speed controlling knob 548 in FIG. 13, a variety of switches, buttons, or levers may be used in a various configurations to accomplish a similar result as described above. These variations are contemplated by this disclosure.

A plurality of paytables may be associated with the different positions of the speed controlling knob 548. That is a higher percentage payback paytable may be used when the speed controlling knob 548 is operated to increase the game speed of the gaming device 500. Likewise, a lower percentage payback paytable may be used when the speed controlling knob 548 is operated to decrease the game speed of the gaming device 500.

The gaming display 520 may also be utilized to communicate to the player that increasing the speed of the game play may increase the payback of the gaming device 500. Although this information could be printed on the gaming cabinet 15 (FIG. 1B), such as on the gaming glass, it may be more preferable to have an indication on the gaming monitor 520 appear when the gaming speed in changed by the player by using the speed controlling knob 548. This indication may be a short 'pop-up' or dialog box that briefly appears on the game display 520 to say, for example, "Increasing game speed increases game payback." In other embodiments, the change in payback percentage may be displayed or even the overall payback percentage. Alternatively, a meter may be displayed on the gaming display 520 where the faster the game speed, the more filled in the meter becomes. This meter may be labeled to emphasize that an increase in game speed further increases the payback of the gaming device 500. This information may also be provided or elaborated upon in a HELP or MENU screen.

Figure 14:
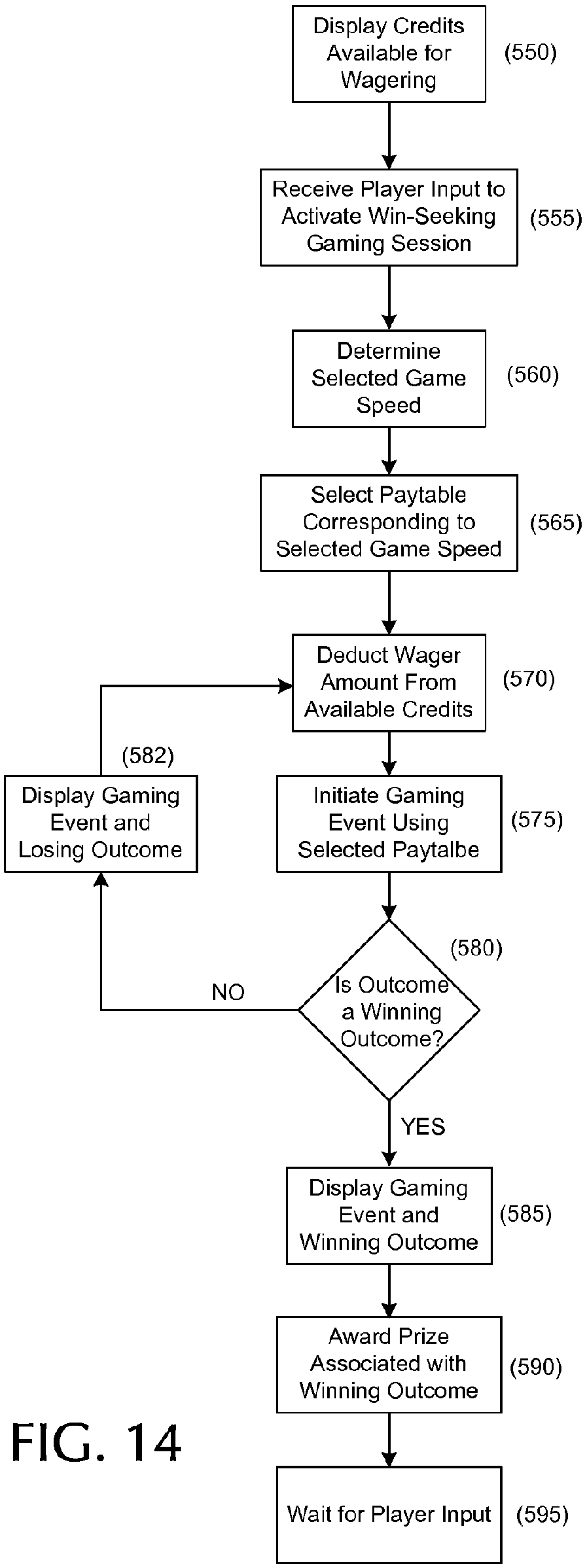
FIG. 14 is a flow diagram of a method of operating a gaming device according to embodiments of the invention.

FIG. 14 is a flow diagram of a method of operating a gaming device according to embodiments of the invention.

Referring to FIGS. 13 and 14, after a player enters credits into a gaming device 500, the credits available for wagering by the player are displayed on a credit meter (550). The gaming device 500 waits until it receives a player input to activate a win-seeking gaming session (555). When the win-seeking gaming session is activated, the gaming device 500 determines the selected game speed (560) based at least in part on the position of the speed controlling knob 548, and selects a paytable corresponding to the selected game speed (570) from a plurality of paytables. The gaming device 500 then deducts an amount wagered by the player from the credits available for wagering (570) and initiates a gaming event using the selected paytable (575).

After the gaming event has been initiated, the gaming device 500 may ascertain an outcome associated with the gaming event and determine if the outcome is a winning outcome (580). If the outcome is not determined to be a winning outcome, the gaming event and the losing outcome may be briefly displayed (582) before another wager amount is deducted from the available credits (570) and another gaming event is initiated using the selected paytable (575). Although not shown, the gaming device 500 may determine if the game speed has been altered by the player, and if so, select a different paytable.

If the outcome is determined to be a winning outcome, the gaming event and the winning outcome of the gaming event are displayed (585). Any prizes associated with the winning outcome are awarded to the player (590) and the gaming session is ended. When the gaming session ends, the gaming device 500 may wait for further player input (595), which may include the initiation of another gaming session or the cashing out of any remaining credits. As discussed above, the duration of the display of the gaming event and/or the outcome may be varied dependent upon whether the outcome is determined to be a preferred outcome.

Figure 15:
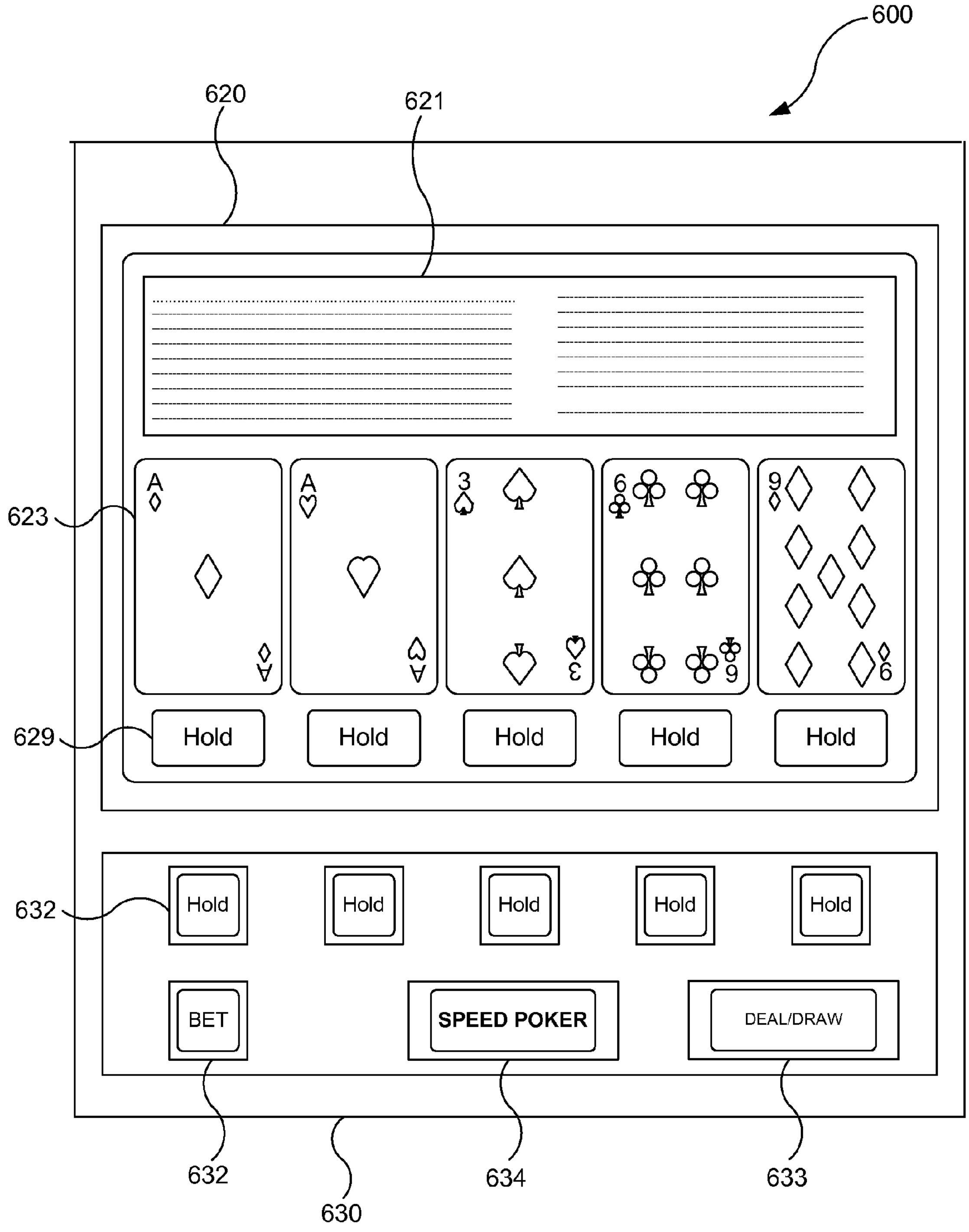
FIG. 15 is a detail diagram of a video poker gaming device according to embodiments of the invention.

FIG. 15 is a detail diagram of a video poker gaming device according to embodiments of the invention.

Referring to FIG. 15, the gaming device 600 includes a video display 620 that displays player information 621, a plurality of playing cards 623, and a plurality of soft buttons 629 associated with each playing card 623. The gaming device 600 may also include a player interface panel 630 that includes a plurality of game buttons 632, a 'Deal/Draw' button, and a 'Speed Poker' button 634. The speed poker button 634 utilizes principles of the present concept and applies them to video poker games. That is, the speed poker button 634 may vary the speed of game play for the video poker gaming device 600 and emphasize larger winning hands. Operation of the video poker gaming device 600 using the speed poker button 634 will be further described with reference to FIG. 16.

Figure 16:
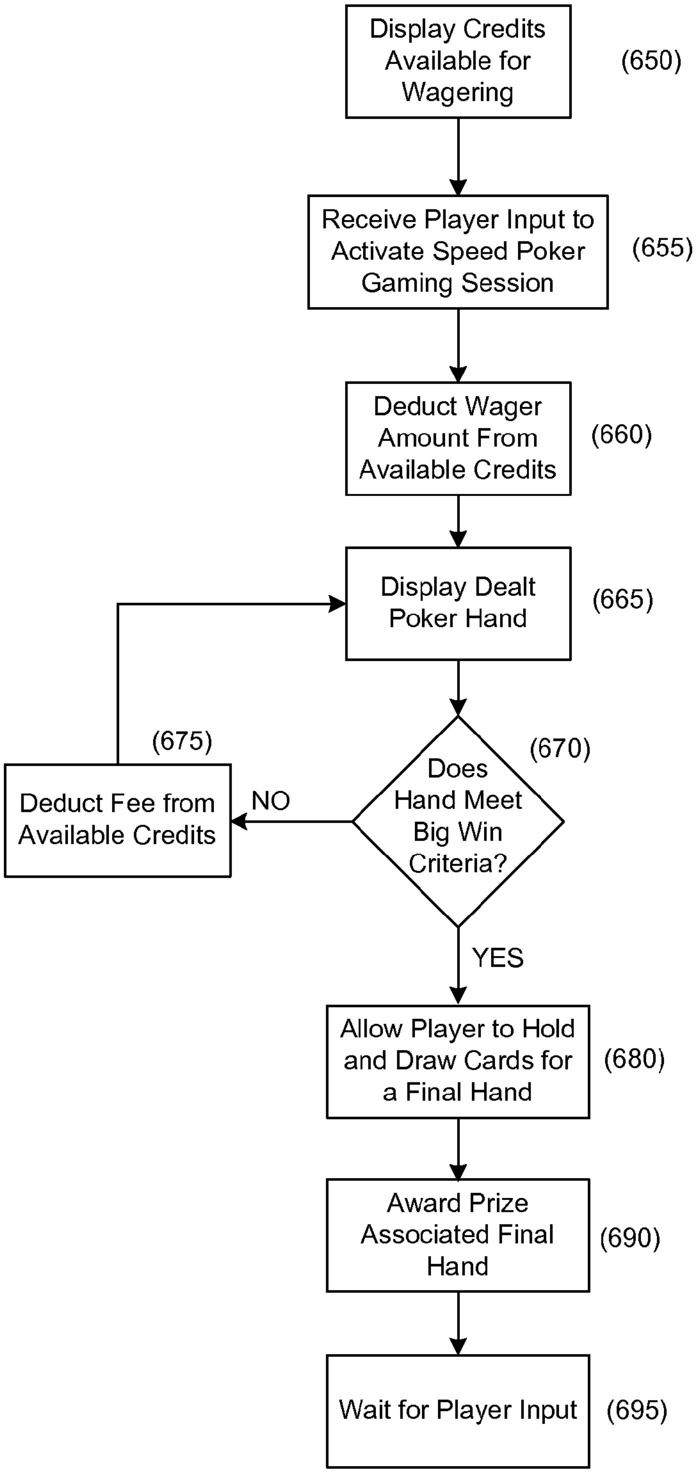
FIG. 16 is a flow diagram of a method of operating a video poker gaming device according to embodiments of the invention.

FIG. 16 is a flow diagram of a method of operating a video poker gaming device according to embodiments of the invention.

Referring to FIGS. 15 and 16, after credits are received from a player for wagering on the video poker gaming device 600, the credits available for wagering on the video poker gaming device 600 are displayed (650). The video poker gaming device 600 than waits to receive a player input to activate a speed poker gaming session (655), which is activated using the speed poker button 634. After the player input is received, a wager amount is deducted from the available credits (660) and a poker hand is dealt (665). The video poker gaming device 600 then determines whether the dealt poker hand meets any big win criteria (670).

Big win criteria may include a variety of conditions on the dealt poker hand. The emphasis here is to keep dealt poker hands that either guarantee wins or are very close to large poker hand wins. In some embodiments, the big win criteria includes receiving a dealt poker hand with a percentage chance greater than a predetermined threshold percentage chance of being a large poker win. For example, if the predetermined threshold percentage chance is defined as 50%, dealt poker hands that have better than a 50% chance of having a winning outcome are allowed to proceed to a subsequent process.

In other embodiments, the big win criteria include receiving a dealt poker hand that meets one of plurality of pre-identified poker hands. For example, any pair of jacks or better that will result in a win, four cards to a flush, four cards to an outside straight, or four cards to a royal flush may be allowed to pass to a subsequent process. In yet other embodiments, the big win criteria includes receiving a dealt poker hand that requires only one card on a subsequent draw to complete one of a plurality of pre-identified large winning poker hands. Here, a large winning poker hand may be defined as a three of a kind or better depending on the availability of wild cards. In still other embodiments, the big win criteria includes receiving a dealt poker hand that requires two cards on a subsequent draw to complete one of a plurality of pre-identified large winning poker hands.

If the dealt poker hand does not meet the big win criteria, a fee is deducted from the credits available to wager (675) and another poker hand is dealt to the player on the video poker gaming device 600. The fee deducted by the gaming device 600 may preferably be smaller than the amount wagered. This is especially preferable when the big win criteria are fairly difficult to reach on a dealt hand.

If the dealt poker hand does meet the big win criteria, the player is then allowed to hold whichever cards from the dealt hand that he or she desires, and then the player is allowed to draw additional cards to replace the un-held cards in making a final poker hand (680). Thereafter, any prizes associated with the final poker hand are awarded to the player (690) and the speed poker gaming session ends. After the speed poker gaming session ends, the gaming device waits for a subsequent player input (695).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a video poker gaming device, the method comprising:

providing game play credits to a player of the gaming devices in response to receipt of value from the player via at least one of a currency acceptor, an electronic account, a ticket acceptor, and a coin acceptor;

displaying the game play credits on a credit meter associated with the video poker gaming device;

receiving an amount wagered from at least some of the game play credits available on the credit meter for wagering on the video poker gaming device for a speed poker gaming session in response to a player input to the video poker gaming device;

displaying a first dealt poker hand on the video poker gaming device;

determining, under control of a programmed processor, if the first dealt poker hand meets a big win criteria;

allowing the player to hold cards and draw cards in the first dealt poker hand when it is determined that the first dealt poker hand meets the big win criteria;

displaying the drawn cards for the first dealt poker hand on the video poker gaming device;

repeatedly providing speed poker hands until a big win criteria is met when it is determined that the first dealt poker hand does not meet the big win criteria, wherein providing speed poker hands is performed under control of the programmed processor and comprises:

automatically deducting a fee from the game play credits after completing display of the preceding dealt poker hand, automatically, under control of the processor, preventing cards from being held or drawn in the first dealt poker hand and proceeding directly from display of the first dealt poker hand to display of a next dealt poker hand, and, determining if the next dealt poker hand meets the big win criteria; and transferring game play credits to at least one of coins, currency, and a ticket, responsive to activation of an actuator on the gaming device.

2. The method of claim 1, wherein the fee deducted is less than the amount wagered.

3. The method of claim 1, wherein the big win criteria includes receiving a dealt poker hand with a percentage chance greater than a predetermined threshold percentage chance of being a large poker win.

4. The method of claim 1, wherein the big win criteria includes receiving a dealt poker hand that meets one of plurality of pre-identified poker hands.

5. The method of claim 1, wherein the big win criteria includes receiving a dealt poker hand that requires only one card on a subsequent draw to complete one of a plurality of pre-identified large winning poker hands.

6. The method of claim 1, wherein the big win criteria includes receiving a dealt poker hand that requires two cards on a subsequent draw to complete one of a plurality of pre-identified large winning poker hands.

* * * * *